(12) United States Patent
Lai et al.

(10) Patent No.: US 7,423,082 B2
(45) Date of Patent: *Sep. 9, 2008

(54) ASSOCIATIVE THICKENERS FOR AQUEOUS SYSTEMS

(75) Inventors: John Ta-Yuan Lai, Broadview Heights, OH (US); Shui-Jen Raymond Hsu, Westlake, OH (US); Krishnan Tamareselvy, Brecksville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 217 days.

This patent is subject to a terminal disclaimer.

(21) Appl. No.: 11/206,393

(22) Filed: Aug. 18, 2005

(65) Prior Publication Data

US 2006/0039939 A1    Feb. 23, 2006

Related U.S. Application Data

(60) Provisional application No. 60/603,448, filed on Aug. 20, 2004.

(51) Int. Cl.
*C09B 67/00* (2006.01)

(52) U.S. Cl. ..................................... 524/280

(58) Field of Classification Search ............... 524/392, 524/196, 197, 201, 238, 239, 280, 502, 507, 524/729, 817, 839; 525/92 C, 123, 535, 525/455
See application file for complete search history.

(56) References Cited

U.S. PATENT DOCUMENTS

| 4,079,028 A | 3/1978 | Emmons et al. |
| 4,180,491 A | 12/1979 | Kim et al. |
| 4,425,485 A | 1/1984 | Sone et al. |
| 4,514,552 A | 4/1985 | Shay et al. |
| 6,596,899 B1 | 7/2003 | Lai |
| 2003/0120101 A1 | 6/2003 | Lai |
| 2003/0162896 A1 | 8/2003 | Destarac et al. |

*Primary Examiner*—Patrick D Niland
(74) *Attorney, Agent, or Firm*—Thoburn T. Dunlap

(57) ABSTRACT

Thiocarbonate compounds which, in one embodiment, are utilized as a rheology modifier or associative thickener. The thiocarbonate compounds thicken or increase the viscosity of a composition, preferably an aqueous composition when used in an effective amount. In one preferred embodiment, the thiocarbonate compounds include at least one hydrophilic group containing repeat unit such as derived from acrylic acid, and at least one hydrophobic group to enhance association with other compounds and thus increase viscosity of a composition. Aqueous composition comprising a latex and thiocarbonate associative thickeners are described.

26 Claims, No Drawings

ASSOCIATIVE THICKENERS FOR AQUEOUS SYSTEMS

RELATED U.S. APPLICATION

This application claims the benefit of priority from U.S. provisional application Ser. No. 60/603,448, filed on Aug. 20, 2004.

FIELD OF THE INVENTION

The present invention relates to thiocarbonate compounds which, in one embodiment, are utilized as a rheology modifier or associative thickener. The thiocarbonate compounds thicken or increase the viscosity of a composition, preferably an aqueous based composition when used in an effective amount. In one preferred embodiment, the thiocarbonate compounds include at least one hydrophilic group containing repeat unit preferably derived from (meth)acrylic acid or (meth)acrylamide or the like, and at least one hydrophobic group to enhance association with other compounds and thus increase viscosity, especially high shear viscosity, of a composition. Aqueous systems comprising a latex and the associative thickeners are also disclosed.

BACKGROUND OF THE INVENTION

Among thickeners, some of the most significant thickeners are water soluble polymers containing hydrophobic groups which are capable of forming intermolecular associations and adsorbing onto the surface of dispersed particles. This class of polymers is referred to as associative thickeners.

Associative thickeners or rheology modifiers provide necessary processing and performance characteristics to various compositions having diverse end uses. For example, thickeners are used in aqueous latex paints to provide a desired viscosity and to stabilize emulsions and pigment dispersions. Associative thickeners are used in waterborne coatings to improve the flow and leveling of coating films, improve film build and film formation, improve gloss, and reduce roller spatter. Thickeners are also used in the preparation of cosmetics and pigment pastes; textile manufacturing; and in many processes that involve the treatment of water including oil drilling and enhanced oil recovery operations.

Aqueous systems utilizing associative thickeners are often required to display an acceptable response to shear induced deformation encountered in the manufacture of the system, and also during application or use.

Associative thickeners are either naturally or synthetically derived compounds. Modified natural compounds which have been utilized in the art for many years include starch, cellulose, alginate, and protein. The natural thickeners generally include building blocks of polysaccharide units or amino acids, and grafting of selected moieties onto the backbone provides for modified versions utilized in different applications. The synthesized polymeric associative thickeners include acrylic-based polymers derived from acrylic acid or acrylate esters among others. The addition of hydrophobic moieties to the acrylic-based polymers has also been performed. Further synthetic associative thickeners include hydrophobically modified polyether-based polyurethanes and hydrophobically modified ethoxylated urethane resins which generally consists of polyethylene glycol units of varying length connected by urethane linkages with the polymer terminated with hydrophobic end groups. The prior art acrylic acid or acrylate associative thickeners typically exhibit inferior properties when compared to polyurethane associative thickeners, even at very high concentration.

U.S. Pat. Nos. 4,079,028, 4,180,491, and 4,425,485 disclosed the use of polyurethane having hydrophobic branching groups as thickeners. U.S. Pat. No. 4,514,552 discloses the use of ethoxylated hydrophobes in acrylic emulsions to make alkali soluble thickeners.

SUMMARY OF THE INVENTION

The associative thickeners of the present invention are derived from a thiocarbonate group containing compound and comprise both hydrophilic and hydrophobic groups within the same compound. The thiocarbonate associative thickeners are utilized in aqueous systems and can also comprise a latex or other conventional synthetic or natural rheology modifiers to increase the viscosity of the system. In preferred embodiments, the thiocarbonate thickeners are random or block copolymers. The hydrophobic group can be located at the terminal end of the (co)polymer, or pendant from the backbone, or a combination thereof.

Various methods are employed to prepare the thiocarbonate associative thickeners of the present invention. In one embodiment, a thiocarbonate associative thickener is prepared by esterification of the thiocarbonate, which incorporates terminal hydrophobic groups, followed by polymerization to incorporate various hydrophilic group containing monomers such as acrylic acids or acrylates into the backbone of the thiocarbonate compound. In a further embodiment, hydrophilic and hydrophobic groups are added to a thiocarbonate compound through polymerization of monomers containing such groups into the backbone of the thiocarbonate compound. In yet another embodiment, terminal hydrophobic groups are added through esterification of said groups present on the thiocarbonate compounds after a polymerization step which incorporates at least a hydrophobic group containing monomer into the thiocarbonate.

DETAILED DESCRIPTION OF THE INVENTION

Thiocarbonate Compounds

The thiocarbonate compounds utilized in the present invention are preferably polythiocarbonates such as dithiocarbonate or trithiocarbonate compounds and derivatives thereof. By the term "thiocarbonate" it is meant a compound having at least one segment having the formula:

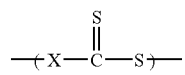

wherein X comprises OR, SR, or $NR_2$ for example with R being various hydrocarbon, heteroatom and/or hydrogen containing structures or the like preferably as illustrated hereinbelow, but not limited thereto.

Suitable trithiocarbonate compounds for use in the present invention, but not limited thereto, are disclosed in U.S. Pat. No. 6,596,899 to Lai, herein fully incorporated by reference.

In one embodiment, trithiocarbonate compounds have the following general formula:

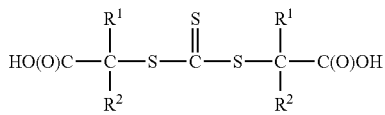

wherein $R^1$ and $R^2$, independently, is the same or different, and is a linear or branched alkyl having from 1 to about 6 carbon atoms, or a $C_1$ to about $C_6$ alkyl having one or more substituents, or one or more aryls or a substituted aryl group having 1 to 6 substituents on the aryl ring, where the one or more substituents, independently, comprise an alkyl having from 1 to 6 carbon atoms; or an aryl; or a halogen such as fluorine or chlorine; or a cyano group; or an ether having a total of from 2 to about 20 carbon atoms such as methoxy, or hexanoxy; or a nitro; or combinations thereof. Examples of such compounds include s,s'-bis-2-methyl-2-propanoic acid-trithiocarbonate and s,s'-bis-(2-phenyl-2-propanoic acid)-trithiocarbonate. $R^1$ and $R^2$ can also form or be a part of a cyclic ring having from 5 to about 12 total carbon atoms. $R^1$ and $R^2$ are preferably, independently, methyl or phenyl groups.

It should be understood that the carbonyl group represented in the various structural formulae set forth throughout the specification and claims can be depicted in several different styles which are used interchangeably as follows:

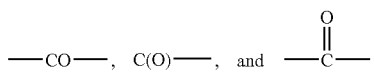

The abbreviated reaction formula for one method for the preparation of s,s'-bis-($\alpha,\alpha'$-disubstituted-$\alpha''$-acetic acid)-trithiocarbonates is generally written as follows:

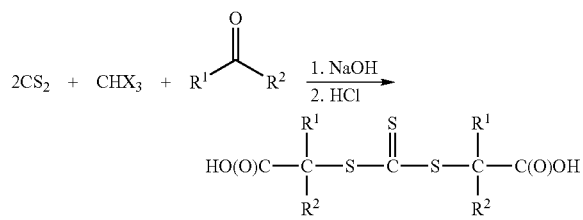

The process utilized to form s,s'-bis-($\alpha,\alpha'$-disubstituted-$\alpha''$-acetic acid)-trithiocarbonate compounds is generally a multi-step process and includes combining the carbon disulfide and a base whereby an intermediate trithio structure is formed. Ketone can serve as solvent for the carbon disulfide/base reaction and thus can be added in the first step of the reaction. In the second step of the reaction, the haloform, or haloform and ketone, or a $\alpha$-trihalomethyl-$\alpha$-alkanol are added to the trithio intermediate mixture and reacted in the presence of additional base. The formed reaction product, is subsequently acidified, thus completing the reaction and forming the above described s,s'-bis-($\alpha,\alpha'$-disubstituted-$\alpha''$-acetic acid)-trithiocarbonate compound.

Another aspect of present invention utilizes trithiocarbonate compounds having the following formula:

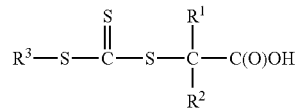

wherein $R^3$ comprises a benzyl group, $C_1$-$C_{18}$ alkyl, or substituted alkyl such as halogen, hydroxyl, or alkoxy, $C_1$-$C_{18}$ hydroxyalkyl, aralkyl, hydroxyalkyl, cyanoalkyl, aminoalkyl, carboxylalkyl, carboalkoxyalkyl or mercaptoalkyl, and $R^1$ and $R^2$ are defined hereinabove. The resulting compound is an s-substituted-s'-($\alpha$, $\alpha'$-disubstituted-$\alpha''$-acetic acid)-trithiocarbonate.

Dithiocarbonate compounds which are utilized in some embodiments of the present invention are disclosed in U.S. application Ser. No.10/278,335 filed Oct. 23, 2002 and U.S. application Ser. No. 10/681,679 filed Oct. 8, 2003, herein fully incorporated by reference. In one embodiment the dithiocarbamate compounds have the following formula:

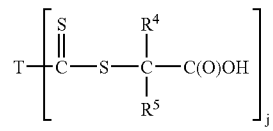

wherein j is 1 or 2, with the proviso that when j is 1, T is –(NR$^6$R$^7$); and when j is 2, T is a divalent radical having a nitrogen atom directly connected to each carbon atom of the two thiocarbonyl groups present;

wherein $R^4$ and $R^5$, independently, is the same or different, is optionally substituted, and is a linear or branched alkyl having from 1 to about 6 or about 12 carbon atoms; or an aryl group having from 6 to about 18 carbon atoms, optionally containing heteroatoms;

wherein the $R^4$ and/or $R^5$ substituents, independently, comprise an alkyl having from 1 to 6 carbon atoms; an aryl group; a halogen; a cyano group; an ether having a total of from 2 to about 20 carbon atoms; a nitro; or combinations thereof. $R^4$ and $R^5$ can also form or be a part of a substituted or unsubstituted cyclic ring having from 3 to about 12 total carbon atoms wherein the substituents are described above. $R^4$ and $R^5$ are preferably, independently, methyl or phenyl groups;

wherein $R^6$ and $R^7$, independently, is the same or different, optionally is substituted, optionally contains heteroatoms; and is hydrogen; a linear or branched alkyl having from 1 to about 18 carbon atoms, an aryl group having from about 6 to about 18 carbon atoms optionally saturated or unsaturated; an arylalkyl having from about 7 to about 18 carbon atoms; an alkenealkyl having from 3 to about 18 carbon atoms; or derived from a polyalkylene glycol ether having from 3 to about 200 carbon atoms. $R^6$ and $R^7$ can also be derived from amines such as, but not limited to, piperazine, morpholine, pyrrolidine, piperidine, 4-alkylamino-2,2,6,6-tetramethyl piperidine, 1-alkylamioalkyl-3,3,5,5-tetramethyl-2 piperazinone, hexamethyleneimine, phenothiazine, iminodibenzyl, phenoxazine, N,N'-diphenyl-1,4-phenylenediamine, dicyclohexylamine and derivatives thereof. $R^6$ and $R^7$ can also form a substituted or unsubstituted cyclic ring, optionally containing heteroatoms, along with the nitrogen having a total of from 4 to about 12 carbon atoms, such as benzotriazole, tolyltriazole, imidazole, 2-oxazolidone, 4,4-dimethyloxazolidone and the like. The $R^6$ and $R^7$ substituents, independently, can be the same as described herein with respect to $R^{13}$. $R^6$ and $R^7$ are preferably, independently, a phenyl group or an alkyl or substituted alkyl having from 1 to about 18 carbon atoms such as a methyl group, or $R^6$ and $R^7$, independently, are hexamethylene.

When j is 1, T of above formula is ($NR^6R^7$) and the dithiocarbamate compound is a S-($\alpha,\alpha'$-disubstituted-$\alpha''$-acetic acid) dithiocarbamate generally having the following formula:

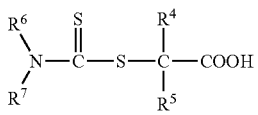

wherein $R^4$, $R^5$, $R^6$, and $R^7$ are as defined hereinabove.

When j is 2, the dithiocarbarbamate compound is a bis-S-($\alpha,\alpha'$-disubstituted-$\alpha''$-acetic acid) dithiocarbamate having the following formula:

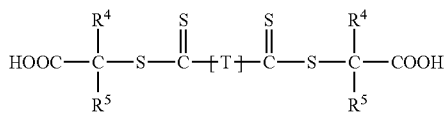

wherein $R^4$ and $R^5$ are defined hereinabove; and wherein T is a divalent bridging radical having a nitrogen atom directly connected to each of the thiocarbonyl groups present.

In one embodiment T is:

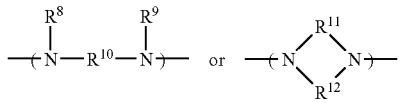

wherein $R^8$ and $R^9$, independently, is the same or different, is optionally substituted, and is hydrogen, a linear or branched alkyl having from 1 to about 18 carbon atoms, an aryl group having from about 6 to about 18 carbon atoms, an arylalkyl having from 7 to about 18 carbon atoms, or an alkenealkyl having from 3 to about 18 carbon atoms, wherein the substituents can be the same as described herein for $R^1$ and $R^2$; wherein $R^{10}$ is optionally substituted, and is non-existent, or an alkylene group having from 1 to about 18 carbon atoms with about 1 to about 6 carbon atoms preferred, or derived from a polyalkylene glycol ether having from 3 to about 200 carbon atoms, wherein the substituents can be the same as described herein for $R^1$ and $R^2$ or are heteroatoms such as oxygen, nitrogen, sulfur or phosphorous; and wherein $R^{11}$ and $R^{12}$ independently, is the same or different, and is optionally substituted as described for $R^1$ and $R^2$, and is an alkylene group having from 1 to about 4 carbon atoms, with $R^{11}$ and $R^{12}$ preferably having a collective total of 3 to 5 carbon atoms.

In further embodiments, T is:

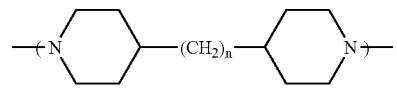

wherein n is 0 to about 18, with 0 to about 6 preferred;

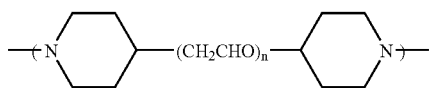

wherein n is 0 to about 18, with 0 to about 6 preferred;

Some specific non-limiting examples of T bridging radicals are:

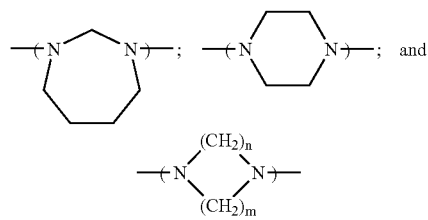

wherein n plus m=3 to 5;

The S-($\alpha,\alpha'$-disubstituted-$\alpha''$-acetic acid) or bis-S-($\alpha,\alpha'$-disubstituted-$\alpha''$-acetic acid) dithiocarbamates are generally a reaction product of a metal salt of a dithiocarbamate, a haloform, and a ketone. A phase transfer catalyst, solvent, and a base such as sodium hydroxide or potassium hydroxide can also be utilized to form the S-($\alpha,\alpha'$-disubstituted-$\alpha''$-acetic acid) or bis S-($\alpha,\alpha'$-disubstituted-$\alpha''$-acetic acid) dithiocarbamates.

It is to be understood throughout the application formulas, reaction schemes, mechanisms, etc., and the specification that metals such as sodium or bases such as sodium hydroxide are referred to and the application of the present invention is not meant to be solely limited thereto. Other metals or bases such as, but not limited to, potassium and potassium hydroxide, respectively, or combinations thereof are contemplated by the disclosure of the present invention.

Alkoxy dithiocarbonate compounds are utilized in some embodiments of the present invention and can be represented by the following general formula:

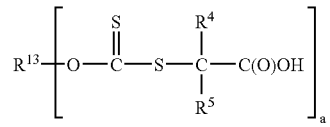

wherein $R^4$ and $R^5$ are as defined hereinabove; and wherein $R^{13}$ is optionally substituted, and can be a linear or branched alkyl having from 1 to about 12 carbon atoms; an aryl group, optionally saturated or unsaturated; an arylalkyl having from 7 to about 18 carbon atoms; an acyl group; an alkenealkyl having from 3 to about 18 carbon atoms; an alkene group; an alkylene group; an alkoxyalkyl; derived from a polyalkylene glycol; derived from a polyalkylene glycol monoalkyl ether having from 3 to 200 carbon atoms; derived from a polyalkylene glycol monoaryl ether having from 3 to 200 carbon atoms; a polyfluoroalkyl such as 2-trifluoroethyl; a phosphorous containing alkyl; or a substituted or unsubstituted aryl ring containing heteroatoms. Alkyl and alkylene groups from 1 to 6 carbon atoms are preferred; wherein the $R^{13}$ substituents comprise an alkyl having from 1 to 6 carbon atoms; an aryl; a halogen such as fluorine or chlorine; a cyano group; an amino group; an alkene group; an alkoxycarbonyl group; an aryloxycarbonyl group; a carboxy group; an acyloxy group; a carbamoyl group; an alkylcarbonyl group; an alkylarylcarbonyl group; an arylcarbonyl group; an arylalkylcarbonyl group; a phthalimido group; a maleimido group; a succinimido group; amidino group; guanidimo group; allyl group; epoxy group; alkoxy group; an alkali metal salt; a cationic substituent such as a quaternary ammonium salt; a hydroxyl group; an ether having a total of from 2 to about 20 carbon atoms such as methoxy, or hexanoxy; a nitro; sulfur; phosphorous; a carboalkoxy group; a heterocyclic group containing one or more sulfur, oxygen or nitrogen atoms, or combinations thereof; and wherein "a" is 1 to about 4, with 1 or 2 preferred. As one skilled in the art will recognize when "a" is 2, 3, or 4, $R^{13}$ will be di-, tri-, or tetra-substituted with the dithiocarbonate moiety represented within the brackets in the formula set forth above The compounds of the above formula are generally identified as O-alkyl-S-(α,α'-disubstituted-α''-acetic acid) xanthates. The O-alkyl-S-(α,α'-disubstituted-α''-acetic acid) xanthates are generated as the reaction product of an alkoxylate salt, carbon disulfide, a haloform, and a ketone. Alternatively, a metal salt of xanthate can be utilized in place of the alkoxylate salt and carbon disulfide.

The general reaction mechanism for forming the O-alkyl-S-(α,α'-disubstituted-α''-acetic acid) xanthates is as follows:

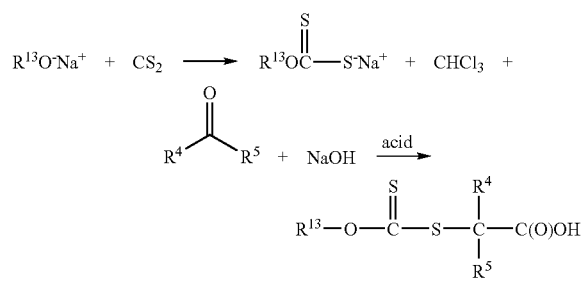

wherein $R^4$, $R^5$, and $R^{13}$ are defined herein.

Hydrophobic Groups

The thiocarbonate associative thickeners include a hydrophobic group or segment. It is believed that the hydrophobic groups associate with each other intermolecularly, or with other polymer or emulsion particles present in an aqueous system and increase the viscosity thereof. It has been found that the thiocarbonate associative thickeners of the invention exhibit desirable viscosity at both low and high shear. The thiocarbonate associative thickener compounds include at least one, and preferably two or more hydrophobic group(s) per molecule. The hydrophobic groups are incorporated into the thiocarbonate compound by reacting the thiocarbonate compound with a monomer, alcohol, or other compound containing the hydrophobe group. For example carboxyl-terminated thiocarbonates can be esterified with an alcohol comprising a hydrophobic portion. Upon reaction, each hydrophobe group becomes a pendant or terminal group on the thiocarbonate associative thickener. The molecular weight and distribution can be regulated during polymerization so that the low shear viscosity and the polymer architecture can be controlled.

In one embodiment, the hydrophobic group includes a long chain alkyl group having generally from about 3 to about 50 carbon atoms, desirably from about 6 to about 30 carbon atoms, and preferably from about 12 to about 22 carbon atoms. A group of (ether)alcohol compounds having a hydrophobic group has one of the following formulae:

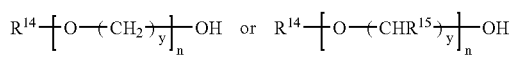

wherein $R^{14}$ an alkyl group having generally from about 3 to about 50 carbon atoms, desirably from about 6 to about 30 carbon atoms, and preferably from about 12 to about 22 carbon atoms; wherein each $R^{15}$, independently, is hydrogen, or an alkyl group of from 1 to about 2 carbon atoms; wherein y is generally from 1 to about 12 and preferably 2 to about 6; and each n is the same or different, and is generally 0 or 1 to about 200, and preferably from 0 or 1 to about 50. For example, when y is 2 and both $R^{15}$'s are hydrogen, the hydrophobic group is derived from a polyethylene glycol monoether. Likewise, when y is 2, one $R^{15}$ is hydrogen and the second is —$CH_3$, the hydrophobic group is derived from a polypropylene glycol monoether. When y is 2, $R^{15}$ is hydrogen or —$CH_3$, and n is greater than 1, the hydrophobic group contains a random or block copolymer of poly(ethylene/propylene) glycol monoether. The hydrophobic group contains a poly-1,3-propylene glycol monoether when y is 3 and $R^{15}$ is hydrogen.

In a further embodiment, the hydrophobic group is a part of an unsaturated monomer, such as an acrylate monomer, polymerizable with the thiocarbonate compound. Unsaturated acrylate monomers containing a hydrophobic functional group in one embodiment have the general formulae:

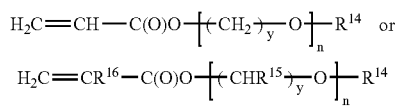

wherein $R^{14}$, $R^{15}$, y, and n are defined hereinabove, and wherein $R^{16}$ is hydrogen or a methyl group.

A terminal hydrophobic group is added to the thiocarbonate compound via an esterification reaction of the acid end group(s) thereon. Some non-limiting examples of reaction mechanisms are as follows:

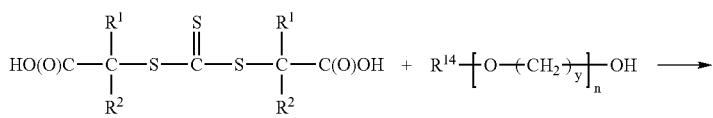

-continued

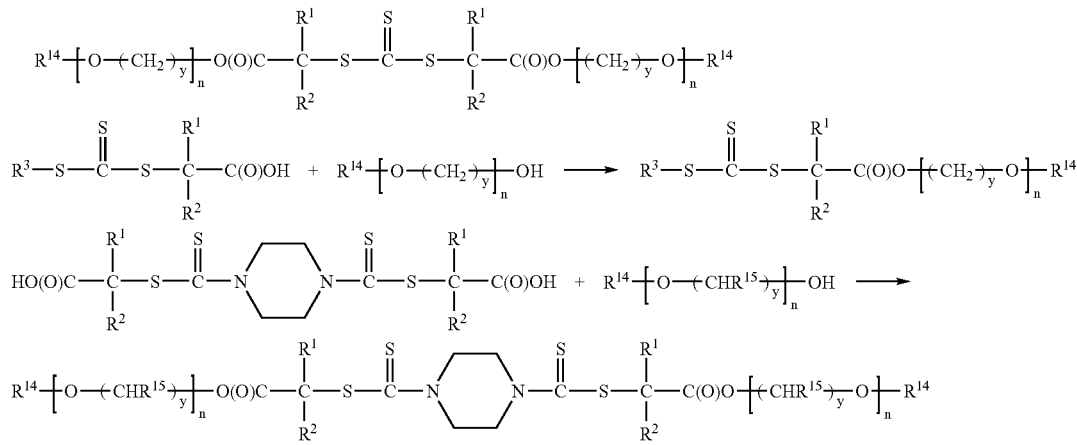

wherein $R^1$, $R^2$, $R^3$, $R^{14}$, $R^{15}$, y, and n are defined herein.

The esterification reaction is performed by combining the thiocarbonate compound and the hydrophobe group containing compound in a suitable reaction vessel. In one embodiment, an effective amount of an acid catalyst is utilized such as, but not limited to, p-toluene sulfonic acid, methane sulfonic acid, hypophosphoric acid, sulfuric acid, with p-toluene sulfonic acid being preferred.

The reactants are heated to a temperature generally from about 35° C. to about 150° C., preferably about 75° C. to about 125° C. for a period of time in order to complete the reaction. The reaction is preferably performed under nitrogen blanket and preferably a vacuum such as 0.1 to 200 mm Hg; or most preferably about 60 mm Hg. As known in the art, progress of the reaction can be monitored by gas chromatography. In one embodiment, the reactants are heated to a temperature of about 100° C. for a period of about 5 hours. In one embodiment, a solvent such as, but not limited to, toluene, methyl isobutyl ketone, or pentyl acetate is utilized. Preferably a means is used to remove the water formed, such as a distillation or a Dean-Stark trap with a refluxing solvent, for example. As illustrated in the above mechanisms, the esterification reaction results in the thiocarbonate compound having at least one terminal hydrophobic group thereon.

The hydrophobe-terminated thiocarbonate compound is then polymerized as described hereinbelow with at least one unsaturated vinyl hydrophilic monomer, such as (meth) acrylic acid, or a mixture of monomers containing at least one hydrophilic monomer to give the amphiphilic associative thickener polymers.

In another embodiment, a hydrophobic pendant group(s) is added to the thiocarbonate compound via a polymerization reaction of a hydrophobe group containing monomer with the thiocarbonate compound. The hydrophobe group containing unsaturated monomers are described hereinabove. Exemplary reaction mechanisms are as follows:

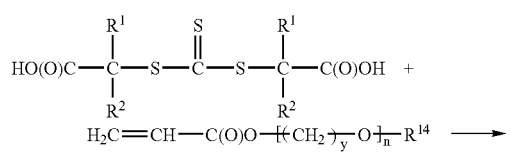

-continued

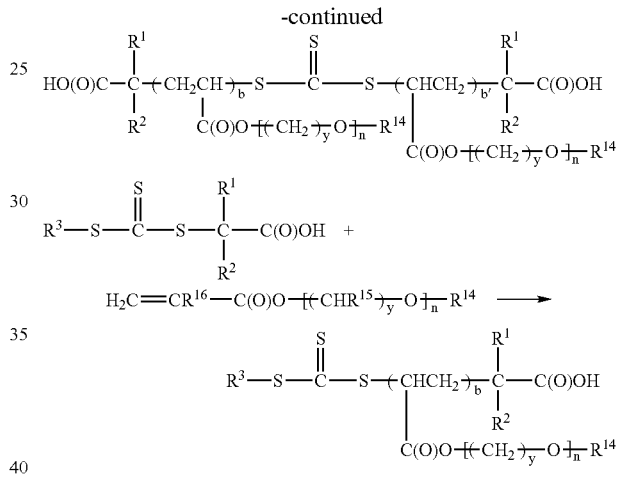

wherein b and b' are 1 to about 20, and preferably about 1 to about 5, and $R^1$, $R^2$, $R^3$, $R^{14}$, $R^{15}$, $R^{16}$, y, and n are defined herein. The polymerization reactions, conditions, etc. are described hereinbelow with respect to the polymerization of hydrophilic group containing monomers and is herein incorporated by reference. As evident from the combination of the above reaction mechanisms, in one embodiment at least one hydrophobic terminal group and at least one hydrophobic pendant group is incorporated into the thiocarbonate compound, preferably via the esterification and polymerization reactions as described.

Hydrophilic Groups

In addition to the at least one hydrophobe group containing moiety present on the thiocarbonate compound, the associative thickeners include at least one hydrophilic group, preferably repeat units derived from one or more hydrophilic group containing unsaturated monomers. Generally, the hydrophilic group containing compounds are acrylic type monomers such as acrylic acid, methacrylic acid, (meth) acrylic acid salts, acrylamide, methacrylamide, ($C_1$-$C_6$) dialkylamino ($C_1$-$C_5$) alkyl(meth)acrylate, alkyl or hydrogen halide salts of ($C_1$-$C_6$) dialkylamino ($C_1$-$C_5$) alkyl(meth) acrylate, hydroxy ($C_1$-$C_6$) alkyl(meth)acrylate, or combinations thereof. In one embodiment, the unsaturated acrylic-based monomers have the following general formulae:

$CH_2=C(CH_3)-C(O)OX$, $CH_2=CH-C(O)OX$, or $CH_2=C(CH_3)-C(O)NH_2$, or $CH_2=CHC(O)NH_2$, $CH_2=C(CH_3)-C(O)NHRN(CH_3)_2$, or $CH_2=CH-C(O)NHRN(CH_3)_2$, or $CH_2=C(CH_3)-C(O)NHRN^+(CH_3)_3Cl^-$, or $CH_2=CH-C(O)NHRN^+(CH_3)_3Cl^-$, wherein R is a substituted or unsubstituted ($C_1$-$C_6$) alkylene group, when substituted said is selected from a ($C_1$-$C_5$) alkyl group, wherein X is H; a metal ion such as Li, Na, K, or Ca; an ammonium ion ($NH_4^+$); an amino group such as ($C_1$ to $C_6$) alkylamino, di-($C_1$ to $C_6$) alkylamino, and di-($C_1$ to $C_6$) amino ($C_1$ to $C_5$) alkyl and a quaternary salt thereof, such as ($C_1$-$C_{24}$) alkyl halide (chloride, bromide, fluoride, iodide); or an hydroxy alkyl group having from 1 to 6 carbon atoms. The alkyl groups set forth above can be branched or unbranched and can be independent of one another such as, for example, in the case of dialkylamino and dialkylaminoalkyl groups. Other hydrophilic monomers include unsaturated polymerizable acids such as maleic acid, fumaric acid, itaconic acid, crotonic acid, oleic acid, cinnamic acid or salts thereof; and unsaturated polymerizable monomers containing sulfonic acid or a salt thereof; diallyl di($C_1$-$C_8$) alkylammonium halides (chloride, bromide, fluoride, iodide); and cyclid N-vinyl monomers such as N-vinyl pyrrolidone, N-vinyl-2-methylimidazole, N-vinylimidazole, N-vinyl-4-methylimidazole, N-vinyl caprolactam, and N-vinyloxazolidone.

Specific hydrophilic monomers or comonomers for use in the present invention include, but are not limited to, the following: acrylic acid, methacrylic acid, 2-hydroxyethyl methacrylate, hydroxypropyl methacrylate (all isomers), hydroxybutyl methacrylate (all isomers); N,N-dimethylaminoethyl methacrylate, N,N-diethylaminoethyl methacrylate, 2-dimethylaminoethyl acrylate, 2-dimethylaminoethyl methacrylate, N,N-diethylaminoethyl acrylate; and their quaternary salts; 2-hydroxyethyl acrylate, hydroxypropyl acrylate (all isomers), hydroxybutyl acrylate (all isomers), polyethylene glycol monoacrylate, polyethylene glycol monomethacrylate, polypropylene glycol monoacrylate, polypropylene glycol monomethacrylate, maleic acid, fumaric acid, itaconic acid, crotonic acid, oleic acid, cinnamic acid, styrene sulfonic acid, and 2-acrylamido-2-methylpropane sulfonic acid (AMPS), N,N-dimethylaminopropyl methacrylamide, N,N-dimethylaminopropyl acrylamide, 3-trimethylammonium propyl methacrylamide chloride, 3-trimethylammonium propyl acrylamide chloride, quaternized N,N-dimethylaminoethyl methacrylate using methylsulphate, quaternized N,N-dimethylaminoethyl methacrylate using methylchloride.

When copolymerizing the unsaturated hydrophobic monomer together with the hydrophilic monomer and optional monomers described herein, the amount of unsaturated hydrophobic monomer(s), to hydrophilic monomer(s) and optional monomers (described below) used in the polymerization medium is not particularly critical so long as the desired thickening ability of the obtained polymer is attained. One skilled in the polymer art will recognize that the amounts of each monomer component can be adjusted to obtain polymers having any desired ratio of monomer components. For illustrative purposes, in one exemplary embodiment, the amount of hydrophobic monomer to hydrophilic monomer employed in the polymerization medium ranges from about 0.01 weight percent to about 99.9 weight percent and the amount of hydrophilic monomer ranges from about 99.9 weight percent to about 0.01 weight percent of the total monomer mixture to be polymerized.

In a further embodiment, other monomers in addition to the hydrophobic and/or hydrophilic monomers described above, are optionally polymerized into the backbone of the thiocarbonate compound during a polymerization reaction. Examples of monomers include, but are not limited to, branched and unbranched ($C_1$ to $C_8$) alkyl esters of (meth) acrylic acid, including but not limited to methyl (meth)acrylate, ethyl (meth)acrylate, butyl (meth)acrylate, and t-butyl (meth)acrylate; vinyl acetate; styrene; diene monomers having a total of from 4 to 12 carbon atoms with examples including, but not limited to, 1,3-butadiene, isoprene, 1,3-pentadiene, 2,3-dimethyl-1-3-butadiene, 2-methyl-1,3-pentadiene, 2,3-dimethyl-1,3-pentadiene, 2-phenyl-1,3-butadiene, and 4,5-diethyl-1,3-octadiene; α-methyl styrene; and $C_1$-$C_{12}$ alkyl styrenes with substitute groups either on the chain or on the ring or both. The amount of these optional monomers can range from about 0 weight percent to about 60 weight percent of the total monomer mixture to be polymerized. In another embodiment the amount of optional monomer can range from about 0 weight percent to about 50 weight percent of the polymerizable monomer mixture.

The ionic content of the polymers of the present invention can be influenced by the tailoring the selection of the hydrophilic group containing monomer(s) that is/are polymerized into the associative polymer backbone. For example, if a salt of hydrophilic monomer and/or a hydrophilic monomer that is capable of forming a salt (subsequent to its incorporation into the polymer backbone by neutralization) is polymerized into the backbone, anionic, cationic, or amphoteric groups can be conferred to the polymer. Hydrophilic monomers capable of conferring ionic groups to the associative polymers of the invention are selected from the carboxylic acid and sulfonic acid containing monomers described above as well as the metal ion (e.g., Li, Na, K, Ca) and ammonium ion salts thereof; the dialkylaminoalkyl containing monomers described above and the ($C_1$-$C_{18}$) dialkyl sulphate salts (e.g., dimethyl sulphate, diethylsulphate) and hydrogen halide salts (e.g., hydrogen chloride, hydrogen fluoride, hydrogen bromide and hydrogen iodide) thereof; and combinations thereof.

In one embodiment, associative polymers containing anionic repeating units can be synthesized by polymerizing a monomer composition comprising a hydrophilic anionic monomer selected from one or more carboxylic acid containing monomers; one or more sulfonic acid containing monomers; one or more salts of said one or more carboxylic acid containing monomers, one or more salts of said one or more sulfonic acid containing monomers; and combinations thereof the presence of a desired thiocarbonate compound having terminal and/or pendant hydrophobic functionality. By anionic monomer is meant that the acid group (carboxylic/sulfonic) containing monomer is in the form of a salt or that the repeating unit polymerized from the acid group containing monomer can be neutralized to a salt subsequent to polymerization. In one exemplary embodiment, 5 to 95 weight percent of the polymerizable monomer composition (based on the weight of the total monomers that make up the monomer composition to be polymerized) comprises a hydrophilic anionic monomer selected from a carboxylic acid group containing monomer(s), a salt of a carboxylic acid containing monomer(s), a sulfonic acid containing monomer(s), a salt of a sulfonic acid containing monomer(s), and combinations thereof. In another exemplary embodiment, 10 to 90 weight percent of the monomer mixture comprises a hydrophilic anionic monomer selected from a carboxylic acid group containing monomer(s), a salt of a carboxylic acid containing monomer(s), a sulfonic acid containing monomer(s), a salt of a sulfonic acid containing monomer(s), and combinations thereof. In still another exemplary embodiment, 10 to 80 weight percent the polymerizable monomer composition comprises a hydrophilic anionic monomer selected from a carboxylic acid group containing monomer(s), a salt of a carboxylic acid containing monomer(s), a sulfonic acid containing monomer(s), a salt of a sulfonic acid containing monomer(s), and combinations thereof.

Examples of hydrophilic anionic monomers that contain carboxylic and sulfonic acid functionality include but are not limited to acrylic acid, methacrylic acid, maleic acid, fumaric acid, itaconic acid, crotonic acid, oleic acid, cinnamic acid, styrene sulfonic acid, and 2-acrylamido-2-methylpropane sulfonic acid (AMPS), and the metal ion (e.g., Li, Na, K, Ca) and ammonium ion salts thereof.

In another embodiment, associative polymers containing cationic repeating units can be synthesized by polymerizing a monomer composition comprising a hydrophilic cationic monomer selected from one or more dialkylaminoalkyl containing group containing monomers and salts thereof in the presence of a desired thiocarbonate compound having terminal and/or pendant hydrophobic functionality. More specifically, the monomer is selected from one or more of di-($C_1$ to $C_6$) amino ($C_1$ to $C_5$) alkyl acrylates and methacrylates (and the hydrogen halide salts thereof, and combinations thereof. The alkyl groups attached to the nitrogen atom can be the same or different (e.g., independent of one another). By cationic monomer is meant that the dialkylaminoalkyl group containing monomer is in the form of a salt or that the repeating unit polymerized from the dialkylaminoalkyl group containing monomer can be neutralized to a salt subsequent to polymerization. In one exemplary embodiment, 5 to 95 weight percent of the polymerizable monomer composition (based on the weight of the total monomers that make up the monomer composition) comprises a hydrophilic cationic monomer selected from one or more of di-($C_1$ to $C_6$) amino ($C_1$ to $C_5$) alkyl acrylates and methacrylates and the ($C_1$-$C_{18}$) dialkyl sulphate and hydrogen halide salts thereof. In another exemplary embodiment, the amount of hydrophilic cationic monomer comprises 10 to 90 weight percent of the monomer mixture, and in a still further exemplary embodiment the amount of hydrophilic cationic monomer comprises 10 to 80 weight percent of the total monomer mixture.

Examples of hydrophilic cationic monomers suitable for the cationic associative polymers of the invention include but are not limited to N,N-dimethylaminoethyl methacrylate, N,N-diethylaminoethyl methacrylate, 2-dimethylaminoethyl acrylate, 2-dimethylaminoethyl methacrylate, and the hydrogen halide (e.g., chloride, bromide, iodide, fluoride) salts thereof.

In a further embodiment of the invention, amphoteric associative polymers (e.g., the polymer backbone includes repeating units polymerized from anionic and cationic monomers) can be synthesized by polymerizing an amphoteric monomer composition comprising both acid functional monomers (and/or their salts) and dialkylaminoalkyl monomers (and/or their salts). An amphoteric monomer composition comprising the hydrophilic anionic and hydrophilic cationic monomers and the salts thereof set forth above can be polymerized in the presence of the desired thiocarbonate compound having terminal and/or pendant hydrophobic functionality to obtain a polymer having amphoteric character. The relative amount of anionic monomer(s) to cationic monomer(s) present in the polymerizable monomer composition can range from 1 to 99 parts anionic monomer(s) to 99 to 1 part cationic monomer(s). In one exemplary embodiment, amphoteric monomers comprise 5 to 95 weight percent of the total polymerizable monomer composition (based on the weight of the total monomer content of the polymerizable monomer mixture). In another exemplary embodiment, the amount of amphoteric monomer comprises 10 to 90 weight percent of the monomer mixture, and in a still further exemplary embodiment the amount of amphoteric monomer comprises 10 to 80 weight percent of the total monomer mixture.

In another embodiment, non-ionic associative polymers can be synthesized by polymerizing a non-ionic monomer mixture that contains one or more of the hydrophilic monomers described above that are non-salts and that do not form salts in the presence of an acid or a base (i.e., non-ionic monomers). The hydrophilic non-ionic monomers can be polymerized in the presence of the desired thiocarbonate compound having terminal and/or pendant hydrophobic functionality to obtain a polymer having non-ionic character. Examples of non-ionic monomers include but are not limited to acrylamide, methacrylamide, and 2-hydroxyethyl methacrylate, hydroxypropyl methacrylate (all isomers), hydroxybutyl methacrylate (all isomers), 2-hydroxyethyl acrylate, hydroxypropyl acrylate (all isomers), hydroxybutyl acrylate (all isomers), polyethylene glycol monoacrylate, polyethylene glycol monomethacrylate, polypropylene glycol monoacrylate, polypropylene glycol monomethacrylate, and combinations thereof. In one exemplary embodiment of the invention, the polymerizable monomer mixture comprises 50 to 95 weight percent (based on the weight of the total polymerizable monomer mixture) of the hydrophilic non-ionic monomers. In another exemplary embodiment, the amount of hydrophilic non-ionic monomer comprises 60 to 95 weight percent of the monomer mixture, and in a still further exemplary embodiment the amount of hydrophilic non-ionic monomer comprises 65 to 80 weight percent of the total monomer mixture.

It should be recognized that the polymerizable monomer compositions will contain other monomers selected from hydrophobic monomers, hydrophilic monomers (different than the recited hydrophilic monomers for a particular composition), the optional monomers (other than the hydrophobic and hydrophilic monomers set forth above); and mixtures thereof such that the sum of monomers in the polymerizable monomer mixture equals 100 weight percent for the specified ranges of anionic, cationic, amphoteric and non-ionic monomer compositions. For example, if a polymerizable monomer composition contains 95 weight percent anionic monomer(s), the remaining 5 weight percent of the monomer composition can contain a monomer selected from the group of hydrophobic monomers, hydrophilic monomers (excluding anionic monomers), other monomers (other than the hydrophobic and hydrophilic monomers), and mixtures thereof which are described herein.

While overlapping weight ranges for the various monomer components that make up the polymerizable monomer mixture have been expressed for selected embodiments of the invention, it should be readily apparent that the specific amount of each monomer component in the monomer mixture will be selected from its disclosed range such that the desired amount of each monomer will be adjusted so that the sum of all monomer components in the polymerizable monomer mixture will total 100 weight percent.

In order to initiate the polymerization process, it is often desirable to utilize an initiator as a source for initiating free radicals. Generally, the source of initiating radicals can be any suitable method of generating free radicals such as the thermally induced homolytic scission of a suitable compound(s) (thermal initiators such as peroxides, peroxyesters, or azo compounds), the spontaneous generation from monomer, redox initiating systems, photochemical initiating systems or high energy radiation such as electron beam, X- or gamma-radiation. The initiating system is chosen such that under the reaction conditions there is no substantial adverse interaction of the initiator or the initiating radicals with the transfer agent under the conditions of the experiment. The initiator should also have the requisite solubility in the reaction medium or monomer mixture. The thiocarbonate compounds of the invention can serve as an initiator, but the reaction must be run at a higher temperature.

Thermal initiators are chosen to have an appropriate half-life at the temperature of polymerization. The initiators can include one or more of the following compounds: 2,2'-azobis (isobutyronitrile)(AIBN), 2,2'-azobis(2-cyano-2-butane), dimethyl 2,2'-azobisdimethylisobutyrate, 4,4'-azobis(4-cyanopentanoic acid), 1,1'-azobis(cyclohexanecarbanitrile), 2-(t-butylazo)-2-cyanopropane, 2,2'-azobis[2-methyl-N-(1,1)-bis(hydoxymethyl)-2-hydroxyethyl]propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis (N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl) ethyl]propionamide), 2,2'-azobis[2-methyl-N-(2-hydroxyethyl) propionamide], 2,2'-azobis(isobutyramide) dehydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butylperoxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroylperoxide, potassium peroxydisulfate, ammonium peroxydisulfate, di-t-butyl hyponitrite, and dicumyl hyponitrite.

Photochemical initiator systems are chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems production under the conditions of the polymerization. These initiating systems can include, but are not limited to, combinations of the following oxidants, potassium peroxydisuffate, hydrogen peroxide, t-butyl hydroperoxide and reductants, iron (11), titanium (111), potassium thiosulfite, and potassium bisulfite.

Other suitable initiating systems are known to those of ordinary skill in the art, and are described in recent texts. See, for example, Moad and Solomon "The Chemistry of Free Radical Polymerization", Pergamon, London. 1995. pp 53-95.

The preferred initiators of the present invention are 2,2'-azobis(isobutyronitrile)(AIBN), or 4,4'-azobis(4-cyanopentanoic acid), or 2,2'-azobis(2-cyano-2-butane), or 1,1'-azobis (cyclohexanecarbanitrile). The amount of initiators utilized in the polymerization process can vary widely as generally from about 0.001 percent to about 99 percent, and desirably from about 0.01 percent to about 50 or 75 percent based on the total moles of thiocarbonate compound utilized. Preferably small amounts are utilized, such as from about 0.1 percent to about 5, 10, 15, 20, or 25 mole percent based on the total moles of thiocarbonate compound. In order to form polymers which are predominately telechelic, initiators other than the thiocarbonate compounds are utilized in lesser amounts, such as from about 0.001 percent to about 5 percent, desirably from about 0.01 percent to about 4.5 percent, and preferably from about 0.1 percent to about 3 percent based on the molar equivalent to the total moles of thiocarbonate compound utilized.

Optionally, as noted above, solvents may be utilized in the free radical polymerization process. Examples of such solvents include, but are not limited to, $C_6$-$C_{12}$ alkanes, toluene, chlorobenzene, acetone, t-butyl alcohol, and dimethylformamide. The solvents are chosen so that they do not chain transfer themselves. The amount of solvent when utilized in the present invention polymerization process is generally from about 10 percent to about 500 percent the weight of the monomer, and preferably from about 50 percent to about 200 percent the weight of the monomer utilized in the polymerization.

In order to form thiocarbonate compounds having monomer repeat units therein, a predetermined amount of thiocarbonate compound, optionally having hydrophobe groups already present thereon is added to a suitable reaction vessel along with a predetermined amount of monomer(s), optionally solvent, and optionally initiator. The amount of thiocarbonate compound utilized depends on the desired molecular weight of the polymer to be formed and can be calculated as known to one of ordinary skill in the art. A formula for calculating the amount of thiocarbonate compound (TC) is as follows:

$$Mn \text{ of polymer} = \left(\frac{\text{Weight of monomer} \times \text{molecular weight } TC}{\text{Weight of } TC}\right) + \text{molecular weight of } TC$$

In one embodiment, if the thiocarbonate compound utilized in the polymerization reaction does not contain a hydrophobe group, at least one unsaturated monomer containing such a hydrophobe group is utilized in order to produce a hydrophobe group containing thiocarbonate polymer or copolymer.

The resulting polymers or copolymers are either telechelic polymers with identical functional groups at the ends of the chain, or a polymer having a single functional end group and also an initiator terminated chain (formed by using a conventional initiator such as AIBN). As stated above, the ratios between the resulting polymers can be controlled to give desired results and generally depends on the amount of initiator utilized. Obviously, if the initiator is only a thiocarbonate compound of the present invention, the resulting polymers are always telechelic. The greater the amount of the other initiator utilized, proportionally decreases the amount of telechelic polymers formed. The number of repeat groups from all sources, i.e., hydrophobic or hydrophilic group containing monomers, or other monomers, or a combination thereof incorporated into each thiocarbonate compound is generally from about 1 to about 400, desirably from about 1 to about 200, and preferably from about 2 to about 80. Inasmuch as one or more hydrophilic group containing monomers and optionally one or more hydrophobic group containing monomers or other monomers which are generally neither hydrophilic or hydrophobic can be utilized, it is to be understood that repeat groups of the polymers or copolymers of the present invention can be the same or different, respectively. That is, random copolymers, terpolymers, etc., can be formed within either of the repeat groups noted, as well as block copolymers which can be formed by initially adding one monomer and then subsequently adding a different monomer (e.g. an internal block copolymer). In one embodiment, the number of monomers polymerized into the backbone of the thiocarbonate compound is chosen so that the associative thickener imparts a composition with a usable or practical low shear viscosity.

The reaction conditions are chosen so that the temperature utilized will generate a radical in a controlled fashion, wherein the temperature is generally from about room temperature to about 200° C. The reaction can be run at temperatures lower than room temperature, but it is impractical to do so. The temperature often depends on the initiator chosen for the reaction, for example, when AIBN is utilized, the temperature generally is from about 40° C. to about 80° C., when azodicyanodivaleric acid is utilized, the temperature generally is from about 50° C. to about 90° C., when di-t-butylperoxide is utilized, the temperature generally is from about 110° C. to about 160° C., when a thiocarbonate is utilized, the temperature is generally from about 80° C. to about 200° C.

The polymerization process of this invention can be carried out in emulsion, solution or suspension, in either a batch, semi-batch, continuous, or feed mode. In the case of emulsion or suspension polymerization, the medium will often be predominately water and conventional stabilizers, dispersants and other additives can be present. For solution polymerization, the reaction medium can be chosen from a wide range of media to suit the monomer(s) being used.

Illustrative examples of polymerization mechanisms incorporating hydrophilic monomers into thiocarbonate compounds having a terminal hydrophobic group already present thereon are as follows:

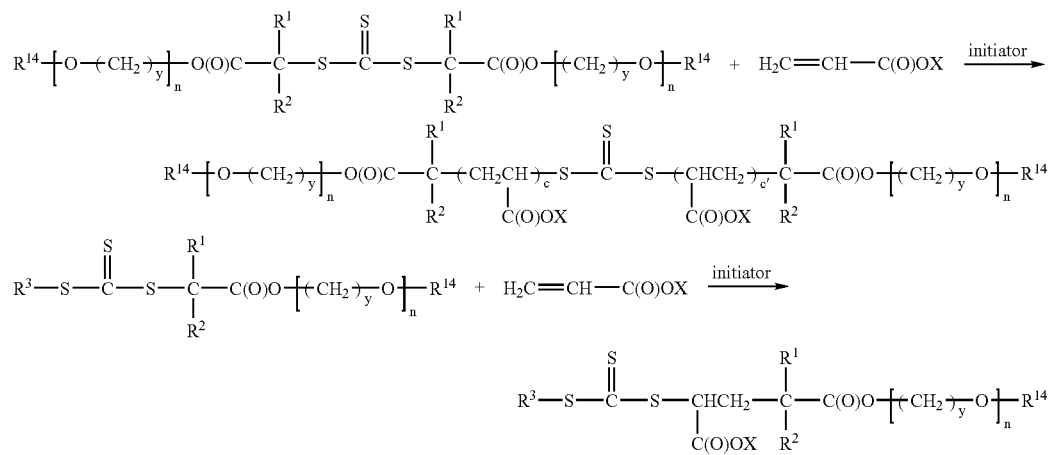

wherein c and c' are each 1 to about 200, and $R^1$, $R^2$, $R^3$, $R^{14}$, n, X and y are defined herein.

Illustrative reaction mechanisms, adding monomers having a pendant hydrophobic group, as well as hydrophilic monomers to a thiocarbonate compound are as follows:

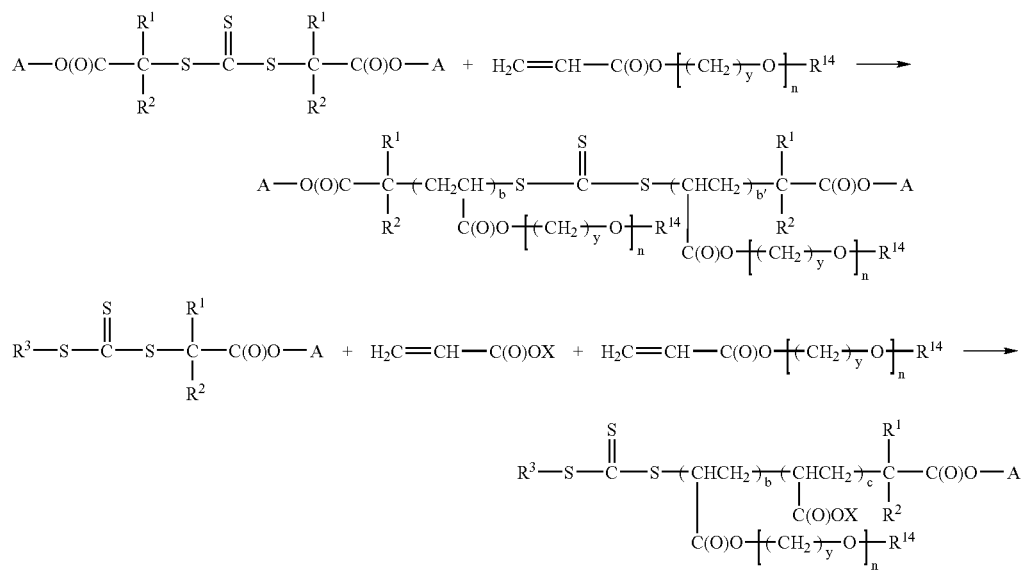

wherein A, b, b', c, c', n, $R^1$, $R^2$, $R^3$, $R^{14}$, X and y are defined herein.

Once the polymerization reaction has been carried out to a desired degree, the thiocarbonate polymers or copolymers containing anionic (e.g., carboxylic and/or sulfonic acid groups), cationic groups (e.g., aminoalkyl and dialkylaminoalkyl groups), and amphoteric groups (e.g., a combination of anionic groups and cationic groups selected from carboxylic acid(s), sulfonic acid(s), aminoalkyl groups, and dialkylaminoalkyl groups) can be neutralized to a desired degree. The anionic groups can be neutralized if desired by any suitable inorganic or organic base. Examples of inorganic bases include but are not limited to the alkali hydroxides (especially sodium, potassium, and ammonium). Examples of organic bases include but are not limited to triethanolamine (TEA), L-arginine, aminomethyl propanol, tromethamine (2-amino 2-hydroxymethyl-1,3-propanediol), PEG-15 cocamine, diisopropanolamine, triisopropanolamine, or tetrahydroxypropyl ethylene diamine. Alternatively, other alkaline materials can be used, such as pre-neutralized surfactants or materials which incorporate a neutralizing agent therein or any other material capable of increasing the pH of the composition. The cationic groups can be neutralized if desired by any suitable organic or mineral acid. Examples of organic acids include but are not limited to citric acid, acetic acid, alpha-hydroxy acid, beta-hydroxy acid, salicylic acid, lactic acid, glycolic acid, or natural fruit acids. Examples of inorganic acids include but are not limited to the hydrogen halides (e.g., hydrochloric acid), nitric acid, sulfuric acid, sulfamic acid, and phosphoric acid. The cationic groups can be pre-neutralized if desired by any suitable ($C_1$-$C_{18}$) dialkyl sulphate.

The degree of neutralization of the anionic and/or cationic groups on the associative polymer backbone can range from about 20 percent to about 100 percent. In another embodiment the degree of neutralization can range from about 40 percent to about 80 percent, and in a further embodiment from about 45 percent to about 65 percent.

The polymer is preferably subsequently isolated by methods known to those of ordinary skill in the art before being utilized as an associative thickener. If the polymerization solvent is water, or water-soluble, then the aqueous solution of the neutralized polymer can be used directly. The polymer can also be diluted with water or solvent or can be concentrated by evaporation of the water or solvent. Alternatively, the obtained polymer can be subsequently dried to a powder or crystallized by utilizing equipment and methods well known in the art.

The associative thickener polymers of the present invention can be utilized in aqueous compositions or systems intended for various purposes. The polymers can also be employed as emulsifiers, stabilizers, suspending aids, film formers, conditioners, moisturizers, spreading aids, odor masking aids, fragrance profile mitigation agents, and carriers for enhancing the efficacy, deposition or delivery of chemically and physiologically active ingredients and as vehicles for improving the psychosensory, and aesthetic properties of a formulation in which they are included.

In one embodiment the polymers of the invention are useful in aqueous latex paints and coatings in order to modify viscosity and thereby improve the rheology of the system. Additional aqueous systems in which the associative thickeners are useful include, but are not limited to, aqueous coating compositions for the paper (surface coatings, such as pigmented coatings, antistatic coatings, and the like, pulp binders, surface sizings, dry and wet strength enhancers, manufacture of wet-laid felts, and the like), leather and textile industries, well flooding compositions and drilling muds, detergents, adhesives, waxes, polishes, water treatment (waste water, cooling water, potable water purification, and the like); chemical spill containment (acid-spill absorbent, and the like), leather and hide processing (processing aids, finishing, coating, embossing, and the like), printing (inks, antiwicking ink-jet printer inks, thickeners for ink formulations containing cationic dyes for printing acrylic fabrics, and the like), crosslinking agents for epoxy latex emulsions, industrial plant effluent treatment (flocculents for phenolics in paper mill effluent, and the like), metal working (acid etch cleaners, low pH metal coatings, pickling agents in cold rolled steel processing, and the like), adhesives (clear adhesives, adhesion promoters for metal, plastic, wood, and the like, non-woven floc adhesive tie coatings, bonding, and the like), wood preservation, and industrial construction products for buildings and roads (cement plasticizers, asphalt emulsion stabilizers at low pH, acid etch for cement, consistency modifiers of concrete, mortar, putty, and the like). The polymers of the present invention are particularly useful as thickeners for rust removers, acid truck cleaners, scale removers, and the like, and as dispersion stabilizers of products containing particulates, such as clay, pigments (titanium dioxide, calcium carbonate, and other minerals), abrasives, and the like, employed in a variety of the foregoing industrial applications.

In addition, the associative thickeners of the present invention can be utilized to formulate a variety of products for personal care, health care, household care, institutional and industrial (collectively "I&I") care, and in a variety of products for medical, agricultural and industrial applications such as but not limited to cosmetics, toiletries, hair care, skin care, topical pharmaceuticals, industrial and home care cleaning compositions, laundry detergents, fabric softeners, pesticidal compositions, and agricultural compositions. The thiocarbonate associative thickeners may be used for thickening water alone, with the resulting solution then being utilized in a second system to be thickened.

In the textile field, the associative thickeners are useful in textile finishes, bonding agents for wovens and non-wovens, tie coats, protective washable surface coatings, manufacture of synthetic leather by saturation of non-woven fabrics and printing, dyeing and coloring compositions. The aqueous compositions may be simple aqueous dispersions or even oil in water emulsions. Cosmetic compositions include, but are not limited to, hand creams, hand lotions, cleansing creams, hair sprays (fixatives), hair creams, cold waving lotions, shampoos, cream rinses and the like.

The thiocarbonate associative thickeners of this invention can be effectively utilized in consumer paints and industrial coatings. Paints and industrial coatings typically comprise an organic polymeric binder, pigments, fillers, and various additives to provide sufficiently fluid compositions to flow out and form a continuous film adapted to be dried or cured to form a hard protective film on a substrate. Pigments can be organic or inorganic and functionally contribute to opacity and color in addition to durability and hardness of the dried paint film. Consumer paints are ambient air drying aqueous based latex compositions applied to architectural interior and/or exterior surfaces for aesthetic appearance and protection of the substrate. Latex paints ordinarily are thickened to promote suspension of the pigment in the latex polymer and provide proper rheology to enable application and flow without sagging. Other additives such as coalescing solvent, gloss control agents, and stabilizing agents can be added as desired.

Latex polymers are aqueous copolymerized ethylenically unsaturated monomers comprising primarily vinyl and/or acrylic monomers. Acrylic monomers include lower alkyl esters of acrylic or methacrylic acid having a lower alkyl chain containing form 1 to about 12 or more carbon atoms. Useful acrylic monomers include for example acrylate and methacrylate esters of methyl, ethyl, propyl, butyl, 2-ethyl hexyl, decyl and iso decyl, benzyl, and similar acrylates and methacrylates, as well as hydroxyethyl and hydroxypropyl acrylates and methacrylates, acrylic acids including acrylic, methacrylic and similar lower alkyl acrylic acids. Useful vinyl monomers include vinyl esters such as vinyl acetate, vinyl propionate, vinyl butyrates, vinyl benzoates and similar vinyl esters, vinyl halides, vinyl aromatic hydrocarbons such as styrene and low alkyl substituted styrenes, chlorostyrene, vinyl toluene and divinyl benzene, and vinyl aliphatic hydrocarbons such as olefins and conjugated dienes. Other useful ethylenically unsaturated monomers include allylic monomers and amido monomers such as acrylamide and methacrylamide and can be added as desired. Latex polymers can be produced by copolymerizing ethylenically unsaturated monomers in an aqueous polymerization medium by adding the monomers to water over a period of time along with surfactants and polymerizing free radical initiators such as peroxides or persulfates.

Industrial thermosetting coatings can be coreactive aqueous emulsion latex polymers or thermosetting water dispersed polymers. Water dispersed polymers ordinarily comprise preformed carboxyl functional polymers prepared in organic solvents and subsequently dispersed into water using a fugitive base such a primary, secondary, or tertiary amine. Useful polymers include for instance polyester, polyacrylates, polyepoxides, polyamides, polyamines, and polyurethanes. Water dispersed thermosetting polymers can be thermoset by heating with a crosslinking agent such as an aminoplast resin.

The thiocarbonate associative thickeners of the present invention may be added to any aqueous composition in an effective amount to provide an adequate or desired level of thickening to the composition. Typically, the active weight of thiocarbonate associative thickener utilized ranges generally from about 0.01 to about 50 parts in one embodiment, from about 0.05 to about 20 parts in another embodiment, from about 0.1 to about 15 parts in a further embodiment and 0.1 to about 5 parts in a still further embodiment; all parts are by weight based on 100 parts by weight of the total composition.

In one embodiment, a composition comprises water and a latex polymer. As known in the art, aqueous compositions can include any desired combination of additives or other adjuvants, with examples including, but not limited to, pigments such as titanium dioxide and carbon black; a defoamer; a solvent; a neutralizer; a dispersant; a biocide; a plasticizer, or a stabilizer. It is to be understood that the amount of the associative thickeners may be higher or lower depending on the particular system utilized, other additives present and other variables understood or known to those of ordinary skill in the art.

Compositions containing the associative polymers of the invention can be packaged and dispensed from containers, such as jars, bottles, tubes, spray bottles, wipes, cans, roll-on containers, stick containers, and the like, without limitation. There is no limitation as to the form of product in which the associative polymer can be incorporated, so long as the purpose for which the product is used is achieved. For example, personal care and health care products containing an associative polymer of the invention can be applied to the skin, hair, scalp and nails in the form of, without being limited thereto, gels, sprays (liquid or foam), emulsions (creams, lotions, pastes), liquids (rinses, shampoos), bars, ointments, suppositories, impregnated wipes, patches, and the like.

As previously discussed, the associative polymers of the invention are suitable in the preparation of personal care (cosmetics, toiletries, health and beauty aids, cosmeceuticals) and topical health care products, including without limitation, hair care products, such as shampoos (including combination shampoos, such as "two-in-one" conditioning shampoos); post-shampoo rinses; setting and style maintenance agents including setting aids, such as gels and sprays, grooming aids, such as pomades, conditioners, perms, relaxers, hair smoothing products, and the like; skin care products (facial, body, hands, scalp and feet), such as creams, lotions, conditioners, and cleansing products; antiacne products; antiaging products (exfoliant, keratolytic, anticellulite, antiwrinkle, and the like); skin protectants such as sunscreens, sunblock, barrier creams, oils, silicones, and the like; skin color products (whiteners, lighteners, sunless tanning accelerators, and the like); hair colorants (hair dyes, hair color rinses, highlighters, bleaches and the like); pigmented skin colorants (face and body makeups, foundation creams, mascara, rouge, lip products, and the like); bath and shower products (body cleansers, body wash, shower gel, liquid soap, soap bars, syndet bars, conditioning liquid bath oil, bubble bath, bath powders, and the like); nail care products (polishes, polish removers, strengtheners, lengtheners, hardeners, cuticle removers, softeners, and the like); and any aqueous acidic to basic composition to which an effective amount of the associative polymer can be incorporated for achieving a beneficial or desirable, physical or chemical, effect therein during storage and/or usage.

Toiletries and health and beauty aids, commonly referred to as HBAs, containing the associative polymer of the invention, can include, without limitation, hair-removal products (shaving creams and lotions, depilatories, after-shave skin conditioners, and the like); deodorants and antiperspirants; oral care products (mouth, teeth and gums), such as mouthwash, dentrifrice, such as toothpaste, tooth powder, tooth polishes, tooth whiteners, breath fresheners, denture adhesives, and the like; facial and body hair bleach; and the like. Other health and beauty aids that can contain the associate polymers, include, without limitation, sunless tanning applications containing artificial tanning accelerators, such as dihydroxyacetone (DHA), tyrosine, tyrosine esters, and the like; skin depigmenting, whitening, and lightening formulations containing such active ingredients as kojic acid, hydroquinone, arbutin, fruital, vegetal or plant extracts, (lemon peel extract, chamomile, green tea, paper mulberry extract, and the like), ascorbyl acid derivatives (ascorbyl palmitate, ascorbyl stearate, magnesium ascorbyl phosphate, and the like); foot care products, such as keratolytic corn and callous removers, foot soaks, foot powders (medicated, such as antifungal athlete's foot powder, ointments, sprays, and the like, and antiperspirant powders, or non-medicated moisture absorbent powder), liquid foot sprays (non-medicated, such as cooling, and deodorant sprays, and medicated antifungal sprays, antiperspirant sprays, and the like), and foot and toenail conditioners (lotions and creams, nail softeners, and the like).

Topical health and beauty aids that can contain the associative polymers (e.g., as spreading aids and film formers) include, without limitation, skin protective spray, cream, lotion, gel, stick and powder products, such as insect repellants, itch relief, antiseptics, disinfectants, sun blocks, sun screens, skin tightening and toning milks and lotions, wart removal compositions, and the like.

The associative polymers of the invention are particularly useful as suspending agents for particulates, such as mica, pearlizing agents, beads, and the like, making them suitable for dermal products containing particulates, microabrasives, and abrasives, such as shower gels, masks and skin cleansers containing exfoliative scrub agents. Numerous cosmetically useful particulate exfoliating agents are known in the art, and the selection and amount is determined by the exfoliating effect desired from the use of the composition, as recognized by those skilled in the cosmetic arts. Useful exfoliating agents include, but are not limited to, biological abrasives, inorganic abrasives, synthetic polymers, and the like, and mixtures thereof. Biological abrasives include, without limitation, shell, seed, and kernel or stone granules or powders, obtained from nuts, such as from walnut (Juglans regia) shells, almonds, pecans, and the like; fruital sources, such as apricots, avocados, coconuts, olives, peaches, and the like; vegetal sources, such as corn cob, oat bran, rice, rose hip seed, jojoba (wax, seed powder), microcrystalline cellulose, ground loofa, ground seaweed, and the like; animal sources, such as oyster shell, silk, microcrystalline collagen, and the like. Inorganic abrasives include, without limitation, stannic oxide, talc, silica (hydrated, colloidal and the like), kaolin, precipitated chalk, salts (sodium chloride, dead sea salt, and the like), ground pumice, and the like. Synthetic polymers include, without limitation, microcrystalline polyamides (nylons), microcrystalline polyesters (polycarbonates), and the like. The polymers of the present invention are also useful for suspending gaseous bubbles in a liquid medium.

The associative polymers are useful as thickeners and film-formers in a variety of dermatological, cosmeceutical compositions employed for topically ameliorating skin conditions caused by drying, photodamage, aging, acne, and the like, containing conditioners, moisturizers, antioxidants, exfoliants, keratolytic agents, vitamins, and the like, typically containing an active acidic ingredient and having a pH in the range of about 0.5 to about 5. When a cationic associative polymer is incorporated into these foregoing acidic product embodiments, the active acid ingredient can serve as both the active skin treatment agent and acid swelling agent for the cationic associative polymer to achieve the desired viscosity.

In one cosmeceutical aspect, a cationic associative polymer can be employed as a thickener for active skin treatment lotions and creams containing, as active ingredients, acidic anti-aging, anti-cellulite, and anti-acne agents, hydroxy carboxylic acids, such as alpha-hydroxy acid (AHA), beta-hydroxy acid (BHA), alpha-amino acid, alpha-keto acids (AKAs), and mixtures thereof. In such cosmeceuticals, AHAs can include, but are not limited to, lactic acid, glycolic acid, fruit acids, such as malic acid, citric acid, tartaric acid, extracts of natural compounds containing AHA, such as apple extract, apricot extract, and the like, honey extract, 2-hydroxyoctanoic acid, glyceric acid (dihydroxypropionic acid), tartronic acid (hydroxypropanedioic acid), gluconic acid, mandelic acid, benzilic acid, azelaic acid, alpha-lipoic acid, salicylic acid, AHA salts and derivatives, such as arginine glycolate, ammonium glycolate, sodium glycolate, arginine lactate, ammonium lactate, sodium lactate, alpha-hydroxybutyric acid, alpha-hydroxyisobutyric acid, alpha-hydroxyisocaproic acid, alpha-hydroxyisovaleric acid, atrolactic acid, and the like. BHAs can include, but are not limited to, 3-hydroxy propanoic acid, beta-hydroxybutyric acid, beta-phenyl lactic acid, beta-phenylpyruvic acid, and the like. Alpha-amino acids include, without being limited thereto, alpha-amino dicarboxylic acids, such as aspartic acid, glutamic acid, and mixtures thereof, sometimes employed in combination with fruit acid. AKAs include pyruvic acid. In some antiaging compositions, the acidic active agent may be retinoic acid, a halocarboxylic acid, such as trichloroacetic acid, an acidic antioxidant, such as ascorbic acid (vitamin C), a mineral acid, phytic acid, lysophosphatidic acid, and the like. Some acidic anti-acne actives, for example, can include salicylic acid, derivatives of salicylic acid, such as 5-octanoyl-salicylic acid, retinoic acid, and its derivatives.

A discussion of the use and formulation of active skin treatment compositions is in COSMETICS & TOILETRIES®, C&T Ingredient Resource Series, "AHAs & Cellulite Products How They Work", published 1995, and "Cosmeceuticals", published 1998, both available from Allured Publishing Corporation, incorporated herein by reference. Compositions containing alpha-amino acids acidified with ascorbic acid are described in U.S. Pat. No. 6,197,317 B1, and a commercial cosmeceutical preparation utilizing these acids in an anti-aging, skin care regimen is sold under the tradename, AFAs, by exCel Cosmeceuticals (Bloomfield Hills, Mich.). The term "AFA", as described in the supplier's trade literature, was coined by the developer to describe the amino acid/vitamin C combination as Amino Fruit Acids and as the acronym for "Amino acid Filaggrin based Antioxidants."

Other health care products in which the associative polymers can be included are medical products, such as topical and non-topical pharmaceuticals, and devices. In the formulation of pharmaceuticals, an associative polymer can be employed as a thickener and/or lubricant in such products as creams, pomades, gels, pastes, ointments, tablets, gel capsules, purgative fluids (enemas, emetics, colonics, and the like), suppositories, anti-fungal foams, eye products (ophthalmic products, such as eye drops, artificial tears, glaucoma drug delivery drops, contact lens cleaner, and the like), ear products (wax softeners, wax removers, otitis drug delivery drops, and the like), nasal products (drops, ointments, sprays, and the like), and wound care (liquid bandages, wound dressings, antibiotic creams, ointments, and the like), without limitation thereto.

The film-forming ability of the associative polymer makes the polymer particularly suitable as a vehicle for topical medical compositions for promoting and enhancing the transdermal delivery of active ingredients to or through the skin, for enhancing the efficacy of anti-acne agents formulations and topical analgesics, and for controlling release of drugs, such as antacids from tablets, or syrups, at low pH, such as in the stomach; controlling drug release from tablets, lozenges, chewables, and the like in the mildly acidic environment of the mouth; or from suppositories, ointments, creams, and the like in the mildly acidic environment of the vagina; to promote deposition of dandruff control agents from shampoos, salves, and the like; to enhance the deposition of colorants on skin from pigmented cosmetics (makeups, lipsticks, rouges, and the like) and on hair from hair dyes, and the like.

In addition to the foregoing, in one embodiment of the invention a cationic associative polymer of the invention at acid pH, makes the polymer useful as a thickener for antistatic, biocidal, antimicrobial, and other preservative compositions, in a variety of personal care, health care, I&I, and medical applications. For example, the polymer can be employed as a thickener in over-the-counter (OTC) health care and pharmaceutical products where cationic biocides are typically employed, such as in oral care compositions for plaque and tartar control, and liquid vehicles containing therapeutic agents, such as syrups, gels, and the like. Under certain controlled pH conditions, the cationic character of the cationic associative polymer embodiment, itself, may also provide antistatic activity or biocidal, antimicrobial, or like preservative activity.

The polymers of the present invention can be employed, without limitation, as a lubricant coating for medical devices, such as soft tissue implants, surgical gloves, catheters, cannulae, and the like, as removable protective film coatings for medical instruments, wound dressings, and the like, as a muco-adhesive, especially in the acid environment of the stomach, as a carrier and thickener in formulated products for medical applications, such as disinfectant hand creams, antiviral products (for anionic viruses), antibiotic ointments, sprays and creams, non-drip, sprayable disinfectant in hospitals, hard surface antimicrobial finish applied during routine maintenance, and the like.

In home care and I&I applications, the polymers of the present invention can be used, for example, as a rheology modifier, fabric conditioning agent, antistatic agent, especially to improve formulation efficiency through "cling-on-surface" or improving efficacy of disinfectants, and biocidal formulations, and to synergistically improve fabric softening efficacy in combination with traditional fabric softeners. Typical household and I&I products that may contain polymers of the invention, include, without being limited thereto, laundry and fabric care products, such as detergents, fabric softeners (liquids or sheets), ironing sprays, dry cleaning aids, antiwrinkle sprays, spot removers and the like; hard surface cleansers for the kitchen and bathroom and utilities and appliances employed or located therein, such as toilet bowl gels, tub and shower cleaners, hard water deposit removers, floor and tile cleansers, wall cleansers, floor and chrome fixture polishes, alkali-strippable vinyl floor cleaners, marble and ceramic cleaners, air freshener gels, liquid cleansers for dishes, and the like; disinfectant cleaners, such as toilet bowl and bidet cleaners, disinfectant hand soaps, room deodorizers, and the like.

Products containing polymers of the present invention can contain various conventional additives and adjuvants known in the art, some of which can serve more than one function. The amounts employed will vary with the purpose and character of the product and can be readily determined by one skilled in the formulation arts and from the literature. The term "cosmetic adjuvant" includes cosmetically and pharmaceutically acceptable product stabilizing and product finishing agents that maintain the physical stability of the composition and its visible aesthetic appearance and market appeal during the useful shelf life of the composition.

The term "fixative" as applied to polymers encompasses the properties of film-formation, adhesion, or coating deposited on a surface on which the polymer is applied. The terms "hair styling and hair fixative" as commonly understood in the hair care arts, and as used herein, refer collectively to hair setting agents that are hair fixatives and film formers and which are topically applied to the hair to actively contribute to the ease of styling and/or holding of a hair set, and to maintain the restylability of the hair set. Hence, hair setting compositions include hair styling, hair fixative, and hair grooming products that conventionally are applied to the hair (wet or dry) in the form of gels, rinses, emulsions (oil-in-water, water-in-oil or multiphase), such as lotions and creams, pomades, sprays (pressurized or non-pressurized), spritzes, foams, such as mousses, shampoos, solids, such as sticks, semisolids and the like, or are applied from a hair setting aid having the hair setting composition impregnated therein or coated thereon, to leave the hair setting agent in contact on the hair for some period until removed, as by washing.

The term "conditioning agents", and grammatical variations thereof, as it relates to compositions for skin care and hair care includes cosmetically and pharmaceutically useful materials that are humectants, moisturizers, and emollients. It is recognized that some conditioning agents can serve more than one function in a composition, such as emulsifying agents, lubricants, and solvents.

In one aspect of the invention, a hair care composition embodiment comprises a polymer of the present invention in an amount effective to provide to the hair care composition a property, such as a hair fixative property, a hair conditioning property, a viscid property (thickening, rheology modifying), or a combination thereof. Optionally, the hair care composition can include one or more auxiliary film-forming agent, auxiliary hair-fixative agent, auxiliary hair conditioning agent, auxiliary rheology modifying agent, or a mixture thereof.

In another embodiment of the invention, a skin care composition embodiment comprises a polymer of the present invention in an amount effective to provide to the skin care composition a property, such as a skin conditioning property, a viscid property (thickening, rheology modifying), or a combination thereof. Optionally, the skin care composition can include one or more auxiliary skin conditioning agent, auxiliary rheology modifying agent, or a mixture thereof.

Product formulations comprising an associative polymer of this invention can contain various additives and cosmetic adjuvants, conventionally or popularly included in personal care, household care, institutional care, and industrial care products, and in industrial processes. The choice and amount of ingredients in formulated compositions containing an associative polymer of the invention will vary depending on the product and its function, as is well known to those skilled in the formulation arts. Formulation ingredients typically can include, but are not limited to acidifying or alkalizing pH adjusting agents and buffering agents; auxiliary fixatives and film formers; auxiliary rheology modifiers; viscosity adjusters; additives, such as emulsifiers, emulsion stabilizers, waxes, dispersants, and the like, and viscosity control agents, such as solvents, electrolytes, hydrotropes, and the like; auxiliary conditioning agents, such as antistatic agents, synthetic oils, vegetable or animal oils, silicone oils, monomeric or polymeric quaternized ammonium compounds and derivatives thereof, sheen enhancers, moisturizers, emollients, humectants, lubricants, sunscreen agents, and the like; moisture barriers/emollients, oxidizing agents; reducing agents; surfactants, such as anionic, cationic, nonionic, amphoteric, zwitterionic surfactants, and silicone derivatives thereof; polymer film modifying agents, such as plasticizers, tackifiers, detackifiers, wetting agents, and the like; product stabilizing and finishing agents, such as chelating agents, opacifiers, pearlizing agents, proteinaceous materials and derivatives thereof, vitamins and derivatives thereof, pharmaceutically active materials, preservatives, fragrances, solubilizers, colorants (temporary or permanent), such as pigments and dyes, UV absorbers, and the like; propellants (water-miscible or water-immiscible), such as fluorinated hydrocarbons, liquid volatile hydrocarbons, compressed gases, and the like; and mixtures thereof.

Additives and adjuvant ingredients, products, or materials, which may be employed with the inventive associative polymers discussed herein will be referred to by the international nomenclature commonly referred to as INCI name given them in the *International Cosmetic Ingredient Dictionary*, published by the Cosmetic, Toiletry, and Fragrance Association, Washington D.C.(hereafter *INCI* Dictionary), such as can be found in any edition thereof, for example, Volumes 1 and 2, Sixth Edition, (1995) or Volumes 1-3, Seventh and Eighth Editions, (1997, 2000), or by their commonly used chemical names. Numerous commercial suppliers of materials listed by INCI name, trade name or both can be found in the *INCI* Dictionary and in numerous commercial trade publications, including but not limited to the 2001 *McCutcheon's Directories*, Volume 1: Emulsifiers & Detergents and Volume 2: Functional Materials, published by McCutcheon's Division, The Manufacturing Confectioner Publishing Co., Glen Rock, N.J. (2001); and 2001 *Cosmetic Bench Reference*, edition of *COSMETICS & TOILETRIES®*, 115 (13), published by Allured Publishing Corporation, Carol Stream, Ill. (2001); the relevant disclosures of each are incorporated herein by reference. Such components and the formulation of compositions are also described in detail in well known references, such as *Cosmetics Science and Technology*, First Edition (Sagarin (ed)), published 1957, and Second Edition (Balsam, et al. (eds)), published 1972-74; and *The Chemistry and Manufacture of Cosmetics*, Second Edition (deNavarre (ed)), published 1975, and Third Edition (Schlossman (ed)), published 2000, both available from Allured Publishing Corporation; Rieger (ed), *Harry's Cosmeticology*, 8th Edition, Chemical Publishing, Co., Inc., New York, N.Y. (2000); and various formularies available to those skilled in the pharmaceutical arts, such as *Remington's Pharmaceutical Sciences*, Fourteenth Edition, Mack Publishing Company, Easton, Pa. (1970); the relevant disclosures of each are incorporated herein by reference.

It is known that formulated compositions for personal care and topical, dermatological, health care, which are applied to the skin and mucous membranes for cleansing or soothing, are compounded with many of the same or similar physiologically tolerable ingredients and formulated in the same or similar product forms, differing primarily in the purity grade of ingredient selected, by the presence of medicaments or pharmaceutically accepted compounds, and by the controlled conditions under which products may be manufactured. Likewise, many of the ingredients employed in products for households, and I&I are the same or similar to the foregoing, differing primarily in the amounts and material grade employed. It is also known that the selection and permitted amount of ingredients also may be subject to governmental regulations, on a national, regional, local, and international level. Thus, discussion herein of various useful ingredients for personal care and health care products may apply to household and I&I products and industrial applications.

The choice and amount of ingredients in formulated compositions containing an associative polymer of the invention will vary depending on the product and its function, as is well known to those skilled in the formulation arts. Formulation ingredients for personal care and topical health care products typically can include, but are not limited to, solvents and diluents (including water), anionic, cationic, amphoteric, and nonionic surfactants (as cleansing agents, emulsifying agents, foam boosters, hydrotropes, solubilizing agents, and suspending agents), nonsurfactant suspending agents, emulsifiers, skin conditioning agents (emollients, humectants, moisturizers, and the like), auxiliary rheology modifiers, viscosity adjusting agents, hair conditioning agents, hair fixatives, film-formers, skin protectants, binders, chelating agents, antimicrobial agents, antifungal agents, antidandruff agents, abrasives, adhesives, absorbents, dyes, deodorant agents, antiperspirant agents, opacifying and pearlizing agents, antioxidants, preservatives, propellants, spreading aids, sunscreen agents, sunless skin tanning accelerators, ultraviolet light absorbers, pH adjusting agents, botanicals, hair colorants, oxidizing agents, reducing agents, skin bleaching agents, pigments, physiologically active agents, anti-inflammatory agents, topical anesthetics, fragrance and fragrance solubilizers, and the like, in addition to ingredients previously discussed that may not appear herein. Oral care products, for example, can contain anticaries, antitartar and/or antiplaque agents in addition to surfactants, abrasives, humectants, and flavorants. An extensive listing of substances and their conventional functions and product categories appears in the *INCI* Dictionary, generally, and in Vol. 2, Sections 4 and 5 of the Seventh Edition, in particular, incorporated herein by reference. An exemplary listing of suitable additives, adjuvants, ingredients, etc. for use in combination with the associative polymers of the invention in personal care, topical health care, household care, institutional care, and industrial care products as well as in industrial processes along with exemplary amounts is set forth below.

Suitable chelators include EDTA (ethylene diamine tetraacetic acid) and salts thereof such as disodium EDTA, citric acid and salts thereof, cyclodextrins, and the like, and mixtures thereof. Such suitable chelators typically comprise about 0.001 wt. % to about 3 wt. %, preferably about 0.01 wt. % to about 2 wt. %, and more preferably about 0.01 wt. % to about 1 wt. % of the total weight of the personal care compositions of the present invention.

A diluent such as water (often deionized) can be used and typically comprises about 5 wt. % to about 99 wt. %, and preferably about 20 wt. % to about 99 wt. % of the total weight of the personal care compositions of the present invention.

Suitable humectant skin and/or hair conditioners include allantoin; pyrrolidonecarboxylic acid and its salts; hyaluronic acid and its salts; sorbic acid and its salts; urea; lysine, arginine, cystine, guanidine, and other amino acids; polyhydroxy alcohols such as glycerin, propylene glycol, hexylene glycol, hexanetriol, ethoxydiglycol, dimethicone copolyol, and sorbitol, and the esters thereof; polyethylene glycol; glycolic acid and glycolate salts (e.g. ammonium and quaternary alkyl ammonium); lactic acid and lactate salts (e.g. ammonium and quaternary alkyl ammonium); sugars and starches; sugar and starch derivatives (e.g. alkoxylated glucose); D-panthenol; lactamide monoethanolamine; acetamide monoethanolamine; and the like, and mixtures thereof. Preferred humectants include the $C_3$-$C_6$ diols and triols, such as glycerin, propylene glycol, hexylene glycol, hexanetriol, and the like, and mixtures thereof. Such suitable humectants typically comprise about 1 wt. % to about 10 wt. %, preferably about 2 wt. % to about 8 wt. %, and more preferably about 3 wt. % to about 5 wt. % of the total weight of the personal care compositions of the present invention.

Suitable lubricants include volatile silicones, such as cyclic or linear polydimethylsiloxanes, and the like. The number of silicon atoms in cyclic silicones preferably is from about 3 to about 7 and more preferably 4 or 5. Exemplary volatile silicones, both cyclic and linear, are available from Dow Corning Corporation as Dow Corning 344, 345 and 200 fluids; Union Carbide as Silicone 7202 and Silicone 7158; and Stauffer Chemical as SWS-03314.

The linear volatile silicones typically have viscosities of less than about 5 cP at 25° C., while the cyclic volatile silicones typically have viscosities of less than about 10 cP at 25° C. "Volatile" means that the silicone has a measurable vapor pressure. A description of volatile silicones can be found in Todd and Byers, "Volatile Silicone Fluids for Cosmetics", *Cosmetics and Toiletries*, Vol. 91, January 1976, pp. 27-32, incorporated herein by reference. Other suitable lubricants include polydimethylsiloxane gums, aminosilicones, phenylsilicones, polydimethyl siloxane, polydiethylsiloxane, polymethylphenylsiloxane, polydimethylsiloxane gums, polyphenyl methyl siloxane gums, amodimethicone, trimethylsiloxyamodimethicone, diphenyl-dimethyl polysiloxane gums, and the like. Mixtures of lubricants can also be used. Such suitable lubricants typically comprise about 0.10 wt. % to about 15 wt. %, preferably about 0.1 wt. % to about 10 wt.

%, and more preferably about 0.5 wt. % to about 5 wt. % of the total weight of the personal care compositions of the present invention.

Suitable moisture barriers and or emollients include mineral oil; stearic acid; fatty alcohols such as cetyl alcohol, cetearyl alcohol, myristyl alcohol, behenyl alcohol, and lauryl alcohol; cetyl acetate in acetylated lanolin alcohol, isostearyl benzoate, dicaprylyl maleate, caprylic and capric triglyceride; petrolatum, lanolin, coco butter, shea butter, beeswax and esters there of; ethoxylated fatty alcohol esters such as ceteareth-20, oleth-5, and ceteth-5; avocado oil or glycerides; sesame oil or glycerides; safflower oil or glycerides; sunflower oil or glycerides; botanical seed oils; volatile silicone oils; non-volatile emollients, and the like, and mixtures thereof. Suitable non-volatile emollients include fatty acid and fatty alcohol esters, highly branched hydrocarbons, and the like, and mixtures thereof. Such fatty acid and fatty alcohol esters include decyl oleate, butyl stearate, myristyl myristate, octyldodecyl stearoylstearate, octylhydroxystearate, di-isopropyl adipate, isopropyl myristate, isopropyl palmitate, ethyl hexyl palmitate, isodecyl neopentanoate $C_{12}$-$C_{15}$ alcohol benzoate, diethyl hexyl maleate, PPG-14 butyl ether and PPG-2 myristyl ether propionate, cetearyl octanoate, and the like, and mixtures thereof. Suitable highly branched hydrocarbons include isohexadecane and the like, and mixtures thereof. Such suitable moisture barriers and/or emollients, alone or in combination, typically comprise about 1 wt. % to about 20 wt. %, preferably about 2 wt. % to about 15 wt. %, and more preferably about 3 wt. % to about 10 wt. % of the total weight of the personal care compositions of the present invention.

Suitable neutralizers include triethanolamine, aminomethyl propanol, ammonium hydroxide, sodium hydroxide, other alkali hydroxides, borates, phosphates, pyrophosphates, cocamine, oleamine, diisopropanolamine, diisopropylamine, dodecylamine, PEG-15 cocamine, morpholine, tetrakis(hydroxypropyl)ethylenediamine, triamylamine, triethanolamine, triethylamine, tromethamine (2-Amino-2-Hydroxymethyl-1,3-propanediol, and the like, and mixtures thereof. Such suitable neutralizers typically comprise about 0 wt. % to about 3 wt. %, preferably about 0.01 wt. % to about 2 wt. %, and more preferably about 0.1 wt. % to about 1 wt. % of the total weight of the personal care compositions of the present invention. The forgoing neutralizers can be employed to neutralize the associative polymer or adjust the pH of the final formulated composition.

Suitable opacifiers include glycol fatty acid esters; alkoxylated fatty acid esters; fatty acid alcohols; hydrogenated fatty acids, waxes and oils; kaolin; magnesium silicate; titanium dioxide; silica; and the like, and mixtures thereof. Such suitable opacifiers typically comprise about 0.1 wt. % to about 8 wt. %, preferably about 0.5 wt. % to about 6 wt. %, and more preferably about 1 wt. % to about 5 wt. % of the total weight of the personal care compositions of the present invention.

Suitable pharmaceutical actives useful in the present invention include any chemical substance, material or compound suitable for topical administration to induce any desired local or systemic effect. Such actives include, but are not limited to antibiotics, antiviral agents, analgesics (e.g. ibuprofen, acetyl salicylic acid, naproxen, and the like), antihistamines, anti-inflammatory agents, antipruritics, antipyretics, anesthetic agents, diagnostic agents, hormones, antifungals, antimicrobials, cutaneous growth enhancers, pigment modulators, antiproliferatives, antipsoriatics, retinoids, anti-acne medicaments (e.g. benzoyl peroxide, sulfur, and the like), antineoplastics agents, phototherapeutic agents, and keratolytics (e.g. resorcinol, salicylic acid, and the like), and the like, and mixtures thereof. Such pharmaceutical actives typically comprise about 0.1 wt. % to about 20 wt. % of the total weight of the personal care compositions of the present invention.

Suitable preservatives include polymethoxy bicyclic oxazolidine, methylparaben, propylparaben, ethylparaben, butylparaben, benzoic acid and the salts of benzoic acid, benzyltriazole, DMDM hydantoin (also known as 1,3-dimethyl-5,5-dimethyl hydantoin), imidazolidinyl urea, phenoxyethanol, phenoxyethylparaben, methylisothiazolinone, methylchloroisothiazolinone, benzoisothiazolinone, triclosan, sorbic acid, salicylic acid salts, and the like, and mixtures thereof. Such suitable preservatives typically comprise about 0.01 wt. % to about 1.5 wt. %, preferably about 0.1 wt. % to about 1 wt. %, and more preferably about 0.3 wt.% to about 1 wt.% of the total weight of the personal care compositions of the present invention.

Suitable spreading aids include hydroxypropyl methylcellulose, hydrophobically modified cellulosics, xanthan gum, cassia gum, guar gum, locust bean gum, dimethicone copolyols of various degrees of alkoxylation, boron nitride, talc, and the like, and mixtures thereof. Such suitable spreading aids typically comprise about 0.01 wt. % to about 5 wt. %, preferably about 0.1 wt. % to about 3 wt. %, and more preferably about 0.1 wt. % to about 2.0 wt. % of the total weight of the personal care compositions of the present invention.

Suitable sunscreens can be used in safe and photoprotectively effective amounts in the personal care compositions of the present invention. Suitable sunscreens include those set forth in Segarin et al., *Cosmetics Science and Technology*, at Chapter VIII, pages 1890 et seq. seq., as well as 64 Fed. Reg. 27666-27693 (May 21, 1999). Specific suitable sun screening agents include, for example, p-aminobenzoic acid and its salts and derivatives (ethyl, isobutyl, glyceryl esters; p-dimethylaminobenzoic acid; 2-ethylhexyl-N,N-dimethylaminobenzoate); anthranilates (i.e., o-aminobenzoates; methyl, octyl, amyl, menthyl, phenyl, benzyl, phenylethyl, linalyl, terpinyl, and cycohexenyl esters); salicylates (octyl, amyl, phenyl, benzyl, menthyl, glyceryl, and dipropyleneglycol esters); cinnamic acid derivatives (ethylhexyl-p-methoxy; menthyl and benzyl esters, phenyl cinnamonitrile; butyl cinnamoyl pyruvate); dihydroxycinnamic acid derivatives (umbelliferone, methylumbelliferone, methylaceto-umbelliferone); trihydroxycinnamic acid derivatives (esculetin, methylesculetin, daphnetin, and the glucosides, esculin and daphnin); hydrocarbons (diphenylbutadiene, stilbene); dibenzalacetone and benzalacetophenone; naphtholsulfonates (sodium salts of 2-naphthol-3,6-disulfonic and of 2-naphthol-6,8-disulfonic acids); dihydroxy-naphthoic acid and its salts; o- and p-hydroxybiphenyldisulfonates; coumarin derivatives (7-hydroxy, 7-methyl, 3-phenyl); diazoles (2-acetyl-3-bromoindazole, phenyl benzoxazole, methyl naphthoxazole, various aryl benzothiazoles); quinine salts (bisulfate, sulfate, chloride, oleate, and tannate); quinoline derivatives (8-hydroxyquinoline salts, 2-phenyl quinoline); hydroxymethoxy-substituted benzophenones; uric and vilouric acids; tannic acid and its derivatives (e.g. hexaethylether); (butyl carbityl) (6-propyl piperonyl) ether; hydroquinone; benzophenones (oxybenzone, sulisobenzone, dioxybenzone, benzoresorcinol, 2,2',4,4'-tetrahydroxybenzophenone, 2,2'-dihydroxy-4,4'-dimethoxybenzophenone, octabenzone; 4-isopropyidibenzoylmethane; butylmethoxyldibenzoylmethane; octocrylene; 4-isopropyl-dibenzoylmethane; and camphor derivatives such as methylbenzylidene or benzylidene camphor; and the like, and mixtures thereof. Other sunscreens include the inorganic sunblocks such as titanium dioxide (micronized titanium dioxide, 0.03 microns), zinc oxide, silica, iron oxide and dioxide, and the like, and mixtures thereof with one another and with the aforementioned organic sunscreens. Without being limited by theory, it is believed that these inorganic materials provide a sun screening benefit through reflecting, scattering, and absorbing harmful UV, visible, and infrared radiation. Particularly useful are the sunscreens ethylhexyl-p-methoxycinnamate, octyl salicylate and benzophenone, either alone, as a mixture, or in combination with the physical sunscreen titanium dioxide.

By "safe and photoprotectively" is meant an amount of sunscreen sufficient to provide photoprotection when the composition is applied, but not so much as to cause any side effects such as skin reactions. Suitable sunscreens typically comprise about 0.5 wt. % to about 50 wt. %, preferably about 0.5 wt. % to about 30 wt. %, and more preferably about 0.5 wt. % to about 20 wt. % of the total weight of the skin care compositions of the present invention. Exact amounts will vary depending upon the sunscreen chosen and the desired Sun Protection Factor (SPF).

SPF is a commonly used measure of photoprotection of a sunscreen against erythema. This number is derived from another parameter, the minimal erythemal dose (MED). MED is defined as the least exposure dose at a specified wavelength that will elicit a delayed erythema response. The MED indicates the amount of energy reaching the skin and the responsiveness of the skin to the radiation. The SPF of a particular photoprotector is obtained by dividing the MED of protected skin by the MED of unprotected skin. The higher the SPF, the more effective the agent in preventing sunburn. The SPF value tells how many times longer a person can stay in the sun with use of the sunscreen (compared to the same person with unprotected skin) before that person will experience 1 MED. For example, utilizing a sunscreen with an SPF of 6 will allow an individual to stay in the sun six times longer before receiving MED. As the SPF value of a sunscreen increases, a lesser chance exists for development of tanning of the skin. Commercially available sun screening products have SPF values ranging from 2 to 50.

Suitable viscosity adjusting agents include isopropyl alcohol, ethanol, sorbitol, propylene glycol, diethylene glycol, triethylene glycol, dimethyl ether, butylene glycol, and the like, and mixtures thereof. Such suitable viscosity adjusters typically comprise about 0.1 wt. % to about 60 wt. %, preferably about 1 wt. % to about 40 wt. %, and more preferably about 5 wt. % to about 20 wt. % of the total weight of the personal care compositions of the present invention.

Skin conditioning polymers include quaternized guar gum, quaternized cellulosics, polyquaternium 4, polyquaternium 7, polyquaternium 10, polyquaternium 11, polyquaternium 39, polyquaternium 44, and the like, and mixtures thereof. Such suitable conditioning agents typically comprise about 0.01 wt. % to about 3 wt. %, preferably about 0.1 wt. % to about 2 wt. %, and more preferably about 0.1 wt. % to about 0.5 wt. % of the total weight of the skin care compositions of the present invention.

Various vitamins also can be included in the compositions of the present invention. Suitable vitamins include vitamin A, vitamin B, biotin, pantothenic acid, vitamin C, vitamin D, vitamin E, tocopherol acetate, retinyl palmitate, magnesium ascorbyl phosphate, and the like, and derivatives and mixtures thereof.

Suitable rheology modifiers/emulsifiers include natural, semi-synthetic, and synthetic polymers. Examples of natural and modified natural polymers include polygalactomannan gums and modified polygalactomannan gums such as guar gum and cassia gum, xanthan gums, cellulosics, modified cellulosics, starches, polysaccharides, and the like. Polygalactomannan gums and modified polygalactomannan gums are disclosed in U.S. Pat. No. 4,753,659 and in International Patent Application Nos. PCT/US2004/019585 and PCT/US2004/019426. Examples of synthetic polymers include polymers and copolymers of acrylic acid crosslinked with polyallylsucrose as described in U.S. Pat. No. 2,798,053 which is herein incorporated by reference, polyacrylates, alkali swellable emulsion acrylate copolymers, hydrophobically modified alkali swellable copolymers, hydrophobically modified non-ionic polyurethanes, and the like. Commercially available crosslinked polymers and copolymers of acrylic acid include Carbopol® 934, 940, 941, and 956 carbomer available from Noveon, Inc. Mixtures of the foregoing natural, modified natural and synthetic polymers can also be used. Such suitable rheology modifiers/emulsifiers, alone or in combination, typically comprise about 0.1 wt. % to about 5 wt. %, preferably about 0.3 wt. % to about 3 wt. %, and more preferably about 0.5 wt. % to about 2 wt. % of the total weight of the personal care compositions of the present invention.

The polymers of the present invention prepared as aqueous emulsions are particularly useful for water-based formulations, and formulations containing water-miscible auxiliary solvents, but are not limited thereto. Useful solvents commonly employed are typically liquids, such as water (deionized, distilled or purified), alcohols, polyols, and the like, and mixtures thereof. Non-aqueous or hydrophobic auxiliary solvents are commonly employed in substantially water-free products, such as nail lacquers, aerosol propellant sprays, or for specific functions, such as removal of oily soils, sebum, make-up, or for dissolving dyes, fragrances, and the like, or are incorporated in the oily phase of an emulsion. Non-limiting examples of auxiliary solvents, other than water, include linear and branched alcohols, such as ethanol, propanol, isopropanol, hexanol, and the like; aromatic alcohols, such as benzyl alcohol, cyclohexanol, and the like; saturated $C_{12}$-$C_{30}$ fatty alcohol, such as lauryl alcohol, myristyl alcohol, cetyl alcohol, stearyl alcohol, behenyl alcohol, and the like. Non-limiting examples of polyols include polyhydroxy alcohols, such as glycerin, propylene glycol, butylene glycol, hexylene glycol, $C_2$-$C_4$ alkoxylated alcohols and $C_2$-$C_4$ alkoxylated polyols, such as ethoxylated, propoxylated, and butoxylated ethers of alcohols, diols, and polyols having about 2 to about 30 carbon atoms and 1 to about 40 alkoxy units, polypropylene glycol, polybutylene glycol, and the like. Non-limiting examples of non-aqueous auxiliary solvents include silicones, and silicone derivatives, such as cyclomethicone, and the like, ketones such as acetone and methylethyl ketone; natural and synthetic oils and waxes, such as vegetable oils, plant oils, animal oils, essential oils, mineral oils, $C_7$-$C_{40}$ isoparaffins, alkyl carboxylic esters, such as ethyl acetate, amyl acetate, ethyl lactate, and the like, jojoba oil, shark liver oil, and the like. Some of the foregoing non-aqueous auxiliary solvents may also be conditioners and emulsifiers.

Surfactants are generally employed as cleansing agents, emulsifying agents, foam boosters, hydrotropes and suspending agents. The polymers of the present invention may be employed in formulations containing all classes of surfactants, i.e., anionic surfactants, cationic surfactants, nonionic surfactants, amphoteric surfactants. The term "amphoteric surfactant" as used herein includes zwitterionic surfactants. In addition to the foregoing references, discussions of the classes of surfactants are in *Cosmetics & Toiletries® C&T Ingredient Resource Series*, "Surfactant Encyclopedia", 2nd Edition, Rieger (ed), Allured Publishing Corporation (1996); Schwartz, et al., *Surface Active Agents, Their Chemistry and Technology*, published 1949; and *Surface Active Agents and*

*Detergents*, Volume 11, published 1958, Interscience Publishers; each incorporated herein by reference.

Anionic surfactants include substances having a negatively charged hydrophobe or that carry a negative charge when the pH is elevated to neutrality or above, such as acylamino acids, and salts thereof, for example, acylglutamates, acyl peptides, sarcosinates, and taurates; carboxylic acids, and salts thereof, for example, alkanolic acids and alkanoates, ester carboxylic acids, and ether carboxylic acids; phosphoric acid ester and salts thereof; sulfonic acids and salts thereof, for example, acyl isethionates, alkylaryl sulfonates, alkyl sulfonates, and sulfosuccinates; and sulfuric acid esters, such as alkyl ether sulfates and alkyl sulfates.

Non-limiting examples of anionic surfactants include mono-basic salts of acylglutamates that are slightly acidic in aqueous solution, such as sodium acylglutamate and sodium hydrogenated tallow glutamate; salts of acyl-hydrolyzed protein, such as potassium, palmitoyl hydrolyzed milk protein, sodium cocoyl hydrolyzed soy protein, and TEA-abietoyl hydrolyzed collagen; salts of acyl sarcosinates, such as ammonium myristoyl sarcosine, sodium cocoyl sarcosinate, and TEA-lauroyl sarcosinate; salts of sodium methyl acyltaurates, such as sodium lauroyl taurate and sodium methyl cocoyl taurate; alkanoic acids and alkanoates, such as fatty acids derived from animal and vegetable glycerides that form water-soluble soaps and water-insoluble emulsifying soaps, including sodium stearate, aluminum stearate, and zinc undecylenate; ester carboxylic acids, such as dinonoxynol-9-citrate; salts of acyl lactylates such as calcium stearoyl lactylate and laureth-6 citrate; ethercarboxylic acids derived from ethyoxylated alcohols or phenols having varying lengths of polyoxyethylene chains, such as nonoxynol-8 carboxylic acid, and sodium trideceth-13 carboxylate; mono- and di-esters of phosphoric acid and their salts, such as phospholipids, dilaureth-4-phosphate, DEA-oleth-10 phosphate and tri-ethanolamine lauryl phosphate; salts of acylisethionate, such as sodium cocoyl isethionate; alkylarylbenzene sulfonates, such as alpha-olefin sulfonate (AOS) and alkali metal, alkaline earth metal, and alkanolamine salts thereof, and sodium dodecylbenzene sulfonate; alkyl sulfonates, such as sodium $C_{12}$-$C_{14}$ olefin sulfonate, sodium cocomonoglyceride sulfonate, sodium $C_{12}$-$C_{15}$ pareth-15 sulfonate, and sodium lauryl sulfoacetate; sulfosuccinates, such as mono- and di-esters of sulfosuccinic acid, salts thereof and alkoxylated alkyl and alkylamido derivatives thereof, such as di-$C_4$-$C_{10}$ alkyl sodium sulfosuccinate, disodium laureth sulfosuccinate, disodium oleamido MEA-sulfosuccinate, and disodium $C_{12}$-$C_{15}$ pareth sulfosuccinate; alkyl ether sulfates, such as sodium and ammonium lauryl ether sulfate (having about 1 to about 12 moles ethylene oxide); alkyl sulfates, such as sodium, ammonium and triethanolamine salts of $C_{12}$-$C_{18}$ alkylsulfates, sodium $C_{12}$-$C_{14}$ olefin sulfates, sodium laureth-6 carboxylate, sodium $C_{12}$-$C_{18}$ pareth sulfate, and the like.

Cationic surfactants can have a hydrophobe that carries a positive charge or that is uncharged at pH values close to neutrality or lower, such as alkylamines, alkyl imidazolines, ethoxylated amines, and quaternary ammonium compounds. Cationic surfactants used in cosmetics are preferably N-derivatives and the neutralizing anion may be inorganic or organic. Among the cationic surfactant materials useful herein are quaternary ammonium compounds corresponding to the general formula: $(R^{10}R^{11}R^{12}R^{13}N^+)$ $E^-$, wherein each of $R^{10}$, $R^{11}$, $R^{12}$, and $R^{13}$ are independently selected from an aliphatic group having from 1 to about 22 carbon atoms, or an aromatic, alkoxy, polyoxyalkylene, alkylamido, hydroxyalkyl, aryl or alkylaryl group having 1 to about 22 carbon atoms in the alkyl chain; and $E^-$ is a salt-forming anion such as those selected from halogen, (e.g. chloride, bromide), acetate, citrate, lactate, glycolate, phosphate, nitrate, sulfate, and alkylsulfate. The aliphatic groups can contain, in addition to carbon and hydrogen atoms, ether linkages, ester linkages, and other groups such as amino groups. The longer chain aliphatic groups, e.g., those of about 12 carbons, or higher, can be saturated or unsaturated.

Alkylamines can be salts of primary, secondary and tertiary fatty $C_{12}$-$C_{22}$ alkylamines, substituted or unsubstituted, and substances sometimes referred to as "amidoamines". Non-limiting examples of alkyl amines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone (INCI name for a silicone polymer and blocked with amino functional groups, such as aminoethylamino propylsiloxane). Non-limiting examples of amidoamines and salts thereof include stearamido propyl dimethyl amine, stearamidopropyl dimethylamine citrate, palmitamidopropyl diethylamine, and cocamidopropyl dimethylamine lactate. Other cationic surfactants include distearyldimonium chloride, dicetyldimonium chloride, guar hydroxypropyltrimonium chloride, and the like. At low pH, amine oxides may protonate and behave similarly to N-alkyl amines.

Non-limiting examples of alkyl imidazolines include alkyl hydroxyethyl imidazoline, such as stearyl hydroxyethyl imidazoline, coco hydroxyethyl imidazoline, ethyl hydroxymethyl oleyl oxazoline, and the like. Non-limiting examples of ethyoxylated amines include PEG-cocopolyamine, PEG-15 tallow amine, quaternium-52, and the like.

Quaternary ammonium compounds are monomeric or polymeric materials containing at least one nitrogen atom that is linked covalently to four alkyl and/or aryl substituents, and the nitrogen atom remains positively charged regardless of the environmental pH. Quaternary ammonium compounds comprise a large number of substances that are used extensively as surfactants, conditioners, antistatic agents, and antimicrobial agents and include, alkylbenzyldimethyl ammonium salts, alkyl betaines, heterocyclic ammonium salts, and tetraalkylammonium salts. Long-chain (fatty) alkylbenzyldimethyl ammonium salts are preferred as conditioners, as antistatic agents, and as fabric softeners, discussed in more detail below. Other quaternary ammonium compounds include quaternary ammonium silicones.

Non-limiting examples of alkylbenzyldimethylammonium salts include stearalkonium chloride, benzalkonium chloride, quaternium-63, olealkonium chloride, didecyldimonium chloride, and the like. Alkyl betaine compounds include alkylamidopropyl betaine, alkylamidopropyl hydroxysultaine, and sodium alkylamido propyl hydroxyphostaine. Non-limiting examples of alkyl betaine compounds include oleyl betaine, coco-betaine, cocoamidopropyl betaine, coco-hydroxy sultaine, coco/oleamidopropyl betaine, coco-sultaine, cocoamidopropylhydroxy sultaine, and sodium lauramidopropyl hydroxyphostaine. Heterocyclic ammonium salts include alkylethyl morpholinium ethosulfate, isostearyl ethylimidonium ethosulfate, and alkylpyridinium chlorides, and are generally used as emulsifying agents. Non-limiting examples of heterocyclic ammonium salts include cetylpyridinium chloride, isostearylethylimidonium ethosulfate, and the like. Non-limiting examples of tetraalkylammonium salts include cocamidopropyl ethyldimonium ethosulfate, hydroxyethyl cetyldimonium chloride, quaternium-18, and cocodimonium hyroxypropyl hydrolyzed protein, such as hair keratin, and the like.

The cationic associative polymer embodiments of the present invention are surprisingly compatible with cationic surfactants and other cationic compounds suitable as antistatic agents. The term "antistatic agents" refers to ingredients that alter the electrical properties of cosmetic raw materials or of human body surfaces (skin, hair, etc.) and textiles, for example, by reducing their tendency to acquire an electrical charge and thus, can condition hair, skin and fabrics. The cationic compatibility of the cationic associative polymers makes them suitable for incorporation into formulations containing antistatic agents typically employed in hair care compositions, such as shampoos, post-shampoo conditioning rinses, hair sprays, hair dressings and the like. The antistatic agent can be employed in amounts up to about 30 weight percent of the final composition, but is not limited thereto.

Antistatic agents include, but are not limited to, quaternary ammonium compounds, protein derivatives, synthetic quaternary ammonium polymers, amines, protonated amine oxides, betaines, and the like, which may act as antistatic agents in specific formulations and under controlled pH conditions in addition to any surfactant properties imparted by such materials. In addition to antistatic agents previously discussed, non-limiting examples of quaternary ammonium compounds useful as antistatic agents are acetamidopropyl trimonium chloride, behenamidopropyl dimethylamine, behenamidopropyl ethyidimonium ethosulfate, behentrimonium chloride, cetethyl morpholinium ethosulfate, cetrimonium chloride, cocoamidopropyl ethyldimonium ethosulfate, dicetyldimonium chloride, dimethicone hydroxypropyl trimonium chloride, hydroxyethyl behenamidopropyl dimonium chloride, quaternium-26, quaternium-27, quaternium-53, quaternium-63, quaternium-70, quaternium-72, quaternium-76 hydrolyzed collagen, PPG-9 diethylmonium chloride, PPG-25 diethylmonium chloride, PPG-40 diethylmonium chloride, stearalkonium chloride, stearamidopropyl ethyl dimonium ethosulfate, steardimonium hydroxypropyl hydrolyzed wheat protein, steardimonium hydroxypropyl hydrolyzed collagen, wheat germamidopropalkonium chloride, wheat germamidopropyl ethyldimonium ethosulfate, and the like.

Synthetic quaternary ammonium polymers, include film-forming polymers and conditioning polymers. Non-limiting examples of synthetic quaternary ammonium polymers include polymers and copolymers of dimethyl diallyl ammonium chloride, such as polyquaternium-4, polyquaternium-6, polyquaternium-7, polyquaternium-22, polyquaternium-10, polyquaternium-11 polyquaternium-15, polyquaternium-16, polyquaternium-24, polyquaternium-28, polyquaternium-32, polyquaternium-33, polyquaternium-35, polyquaternium-37, polyquaternium-39, polyquaternium-44, PEG-2-cocomonium chloride, quaternium-52, and the like.

The term "hair setting composition" encompasses products comprising at least one polymer of the present invention as a hair setting agent, which are applied to the hair (wet or dry) before, during or after configuring the hair into the shape (curly or straight) desired, without limitation as to product form.

The polymers of the present invention are surprisingly useful in hair setting and hair styling compositions as the sole film-forming, rheology modifying, conditioning fixative agent. The polymers of the present invention are also useful in combination with commercially available auxiliary hair fixative polymers, such as nonionic, anionic, cationic, and amphoteric hair setting polymers, cationic conditioning polymers, and combinations thereof. Conventional polymeric hair fixative and hair styling polymers, well known in the art, include natural gums and resins and neutral or anionic polymers of synthetic origin. Listings of commercially available hair fixative and conditioning fixative polymers can be readily found in the *INCI* Dictionary, in supplier websites, and in the trade literature. See, for example, the Polymer Encyclopedia published in *Cosmetics & Toiletries®*, 117(12), December 2002 (Allured Publishing Corporation, Carol Stream, Ill.), the relevant disclosures of which are incorporated herein by reference.

Suitable commercially available nonionic polymers (i.e., neutral) used as hair styling or fixative polymers include, without limitation thereto, polyvinylpyrrolidone (PVP), polyvinylpyrrolidone/vinylacetate copolymer (PVPNA), and the like.

Suitable anionic fixative polymers (i.e., supplied in pre-neutralized form or formed in situ by base neutralization) are disclosed in U.S. Pat. No. 6,410,005, and International Patent Application No. WO 03/061615 which are incorporated herein by reference. Such fixative polymers are commercially available from Noveon, Inc., Cleveland, Ohio, and are marketed under the trademarks Fixate® G-100 (supplied in neutralized form), INCI Nomenclautre: AMP-Acrylates/Allyl Methacrylate Copolymer and Fixate® PLUS (supplied as a low pH emulsion), INCI Nomenclature: Polyacrylate-14.

Commercially available cationic fixative polymers include, without limitation thereto, polymers having the INCI name, polyquaternium, such as polyquaternium-4, a diallyldimonium chloride/hydroxyethylcellulose copolymer (such as CELQUAT® H-100, National Starch); polyquaternium-11, a quaternized vinyl pyrrolidone/dimethylaminoethyl methacrylate copolymer (such as GAFQUAT® 734, 755, 755N, ISP); polyquaternium-16, a quaternized vinyl pyrrolidone/vinylimidazolium chloride copolymer (such as LUVIQUAT® FC-370, BASF); polyquaternium-28, a vinylpyrrolidone/methacrylamidopropyltrimethylammonium chloride copolymer (such as GAFQUAT® HS-100, ISP); polyquaternium-46, a quaternized vinylcaprolactam/vinylpyrrolidone/methylvinylimidazolium methosulfate copolymer; polyquaternium-55, a quaternized vinylpyrrolidone/dimethylaminopropylmethylacrylamide/lauryldimethylpropylmethacrylamidoammonium chloride copolymer (such as STYLEZE™ W, ISP), and the like; and amino-substituted polymers which are cationic under acidic pH conditions, such as vinylcaprolactam/PVP/dimethylaminoethylmethacrylate copolymer (such as GAFFIX® VC-713, ISP); PVP/dimethylaminoethylmethacrylate copolymer (such as Copolymer 845, ISP), PVP/DMAPA acrylates copolymer (such as STYLEZE™ CC-10, ISP), the pyrrolidone carboxylic acid salt of chitosan, having the INCI name, Chitosan PCA (such as KYTAMER® PC, Amerchol), and the like.

Suitable amphoteric fixative polymers include, without limitation thereto, octylacryamide/acrylates/butylaminoethylmethacrylate copolymer (such as the AMPHOMER® polymers, National Starch), acrylates/lauryl acrylate/stearyl acrylate/ethylamine oxide methacrylate copolymers (such as the DIAFORMER® polymers, Clariant Corp.), and the like.

Suitable commercial conditioning polymers include polymeric quaternary ammonium salts such as, without being limited thereto, polyquaternium-7, a polymeric quaternary ammonium salt of acrylamide and dimethyl diallylammonium chloride monomers (such as MACKERNIUM™—007, Mcintyre Group, Ltd.); polyquaternium-10, a polymeric quaternary ammonium salt of hydroxyethylcellulose reacted with a trimethylammonium substituted epoxide (such as the UCARE® Polymers JR, LK, LR, SR series, Amerchol and CELQUAT® SC series, National Starch); polyquaternium-39, a polymeric quaternary ammonium salt of acrylic acid, diallyl dimethylammonium chloride and acrylamide (such as the MERQUAT® and MERQUAT® Plus polymers, Ondeo Nalco); quaternized derivatives of natural gums, e.g., guar hydroxypropyltrimonium chloride (such as the JAGUAR® and JAGUAR® Excel polymers, Rhodia, Inc.), and the like.

A number of quaternary ammonium compounds are used for fabric conditioning and fabric care, generally referred to as fabric softening agents, and are typically employed in amounts of up to about 20 weight percent of the total weight of the formulation, but are not limited thereto. Fabric softening agents useful in combination with the cationic associative polymers of the present invention generally include long-chain alkylated quaternary ammonium compounds such as dialkyldimethyl quaternary ammonium compounds, imidazoline quaternary compounds, amidoamine quaternary compounds, dialkyl ester quat derivatives of dihydroxypropyl ammonium compounds; dialkyl ester quat derivatives of methyltriethanol ammonium compounds, ester amide amine compounds, and diester quat derivatives of dimethyldiethanol ammonium chloride, as described in the review article by Whalley, "Fabric Conditioning Agents", *HAPPI*, pp. 55-58 (February 1995), incorporated herein by reference.

In addition to the previously discussed antistatic agents, non-limiting examples of dialkyldimethyl quaternary ammonium compounds, include N,N-dioleyl-N,N-dimethylammonium chloride, N,N-ditallowyl-N,N-dimethylammonium ethosulfate, N,N-di(hydrogenated-tallowyl)-N,N-dimethylammonium chloride, and the like. Non-limiting examples of imidazoline quaternary compounds include 1-N-methyl-3-N-tallowamidoethylimidazolium chloride, 3-methyl-1-tallowylamidoethyl-2-tallowylimidazolinium methylsulfate, available from Witco Chemical Company under the tradename VARISOFT® 475, and the like. Non-limiting examples of amidoamine quaternary compounds include N-alkyl-N-methyl-N,N-bis(2-tallowamidoethyl)ammonium salts where the alkyl group can be methyl, ethyl, hydroxyethyl, and the like. Non-limiting examples of dialkyl ester quat derivatives of dihydroxypropyl ammonium compounds include 1,2-ditallowoyloxy-3-N,N,N-trimethylammoniopropane chloride, 1,2-dicanoloyloxy-3-N,N,N-trimethylammoniopropane chloride, and the like.

In addition, other types of long chain (e.g. natural oil and fatty acid-derived) alkylated quaternary ammonium compounds are suitable fabric softening agents, including, but not limited, to N,N-di(alkyloxyethyl)-N,N-dimethylammonium salts such as N,N-di(tallowyloxyethyl)-N,N-dimethylammonium chloride, N,N-di(canolyloxyethyl)-N,N-dimethylammonium chloride, and the like; N,N-di(alkyloxyethyl)-N-methyl-N-(2-hydroxyethyl)ammonium salts such as N,N-di(tallowyloxyethyl)-N-methyl-N-(2-hydroxyethyl)ammonium chloride, N,N-di(canolyloxyethyl)-N-methyl-N-(2-hydroxyethyl)ammonium chloride, and the like; N,N-di(2-alkyloxy-2-oxoethyl)-N,N-dimethylammonium salts, such as N,N-di(2-tallowyloxy-2-oxoethyl)-N,N-dimethylammonium chloride, N,N-di(2-canolyloxy-2-oxoethyl)-N,N-dimethylammonium chloride, and the like; N,N-di(2-alkyloxyethylcarbonyloxyethyl)-N,N-dimethylammonium salts, such as N,N-di(2-tallowyloxyethylcarbonyloxyethyl)-N,N-dimethylammonium chloride, N,N-di(2-canolyloxyethylcarbonyloxyethyl)-N,N-dimethylammonium chloride, and the like; N-(2-alkanoyloxy-2-ethyl)-N-(2-alkyloxy-2-oxoethyl)-N,N-dimethyl ammonium salts, such as N-(2-tallowyloxy-2-ethyl)-N-(2-tallowyloxy-2-oxoethyl)-N,N-dimethylammonium chloride, N-(2-canoloyloxy-2-ethyl)-N-(2-canolyloxy-2-oxoethyl)-N,N-dimethyl ammonium chloride, and the like; N,N,N-tri(alkyloxyethyl)-N-methyl ammonium salts, such as N,N,N-tri(tallowyloxyethyl)-N-methylammonium chloride, N,N,N-tri(canolyloxyethyl)-N-methylammonium chloride, and the like; N-(2-alkyloxy-2-oxoethyl)-N-alkyl-N,N-dimethyl ammonium salts, such as N-(2-tallowyloxy-2-oxoethyl)-N-tallowyl-N,N-dimethyl ammonium chloride, N-(2-canolyloxy-2-oxoethyl)-N-canolyl-N,N-dimethyl ammonium chloride, and the like.

Preferably, the long-chain alkyl groups are derived from tallow, canola oil, or from palm oil, however, other alkyl groups derived from soybean oil and coconut oil, for example, are also suitable, as are lauryl, oleyl, ricinoleyl, stearyl, palmityl, and like fatty alkyl groups. The quaternary ammonium salt compounds can have any anionic group as a counter-ion, for example, chloride, bromide, methosulfate (i.e. methylsulfate), acetate, formate, sulfate, nitrate, and the like.

Examples of preferred quaternary ammonium fabric softening compounds include N-methyl-N,N-bis(tallowamidoethyl)-N-(2-hydroxyethyl)ammonium methylsulfate and N-methyl-N,N-bis(hydrogenated-tallowamidoethyl)-N-(2-hydroxyethyl) ammonium methylsulfate, each of which materials are available from Witco Chemical Company under the trade names VARISOFT® 222 and VARISOFT® 110, respectively; dialkyl esterquat derivatives of methyltriethanol ammonium salts such as the DEHYQUART® AU series of bis(acyloxyethyl)hydroxyethylmethylammonium methosulfate esterquats available from Cognis, such as DEHYQUART® AU35, AU46, AU56, and the like; and N,N-di(tallowoyloxyethyl)-N,N-dimethylammonium chloride, where the tallow chains are at least partially unsaturated. Other preferred fabric softening agents include the well-known dialkyldimethyl ammonium salts such as N,N-ditallowyl-N,N-dimethyl ammonium methylsulfate, N,N-di(hydrogenated-tallowyl)-N,N-dimethyl ammonium chloride, N,N-distearyl-N,N-dimethyl ammonium chloride, N,N-dibehenyl-N,N-dimethylammonium chloride, N,N-di(hydrogenated tallow)-N,N-dimethyl ammonium chloride (trade name ADOGEN® 442), N,N-ditallowyl-N,N-dimethyl ammonium chloride (trade name ADOGEN® 470, PRAEPAGEN® 3445), N,N-distearyl-N,N-dimethyl ammonium chloride (trade name AROSURF® TA-100), all available from Witco Chemical Company; N,N-dibehenyl-N,N-dimethyl ammonium chloride, sold under the trade name KEMAMINE® Q-2802C by Humko Chemical Division of Witco Chemical Corporation; and N,N-dimethyl-N-stearyl-N-benzylammonium chloride sold under the trade names VARISOFT® SDC by Witco Chemical Company and AMMONYX® 490 by Onyx Chemical Company.

Any of the foregoing fabric softening agents, and mixtures thereof, can be utilized in combination with the associative polymers of the present invention, particularly in laundry and fabric care products. For ester-containing fabric softening agents, the pH of the compositions can influence the stability of the fabric softening agents, especially in prolonged storage conditions. The pH, as defined in the present context, is measured in the neat compositions at about 20° C. In one embodiment, the pH of the composition is less than about 6. In another embodiment, the pH is in the range of from about 2 to about 5, and in another embodiment from about 2.5 to about 3.5.

In addition to protein derivatives previously described, non-limiting examples of protein derivatives include cocodimonium hydroxypropyl hydrolyzed casein, cocodimonium hydroxypropyl hydrolyzed collagen, cocodimonium hydroxypropyl hydrolyzed hair keratin, cocodimonium hydroxypropyl hydrolyzed rice protein, cocodimonium hydroxypropyl hydrolyzed silk, cocodimonium hydroxypropyl hydrolyzed soy protein, cocodimonium hydroxypropyl hydrolyzed wheat protein, cocodimonium hydroxypropyl hydrolyzed silk amino acids, hydroxypropyl trimonium hydrolyzed collagen, hydroxypropyl trimonium hydrolyzed keratin, hydroxypropyl trimonium hydrolyzed silk, hydroxypropyl trimonium hydrolyzed rice bran, hydroxypropyl trimonium hydrolyzed soy protein, hydroxypropyl trimonium hydrolyzed vegetable protein, hydroxypropyl trimonium hydrolyzed wheat protein, soyethyldimonium ethosulfate, soyethyl morpholinium ethosulfate, and the like.

Nonionic surfactants are generally uncharged amphiphiles and usually are alkoxylated to varying degrees. Classes of nonionic surfactants include alcohols, alkanolamides, amine oxides, esters, and ethers. Nonionic alcohols are usually hydroxy derivatives of long-chain $C_8$-$C_{18}$ alkane hydrocarbons, such as cetearyl alcohol, hydrogenated tallow alcohol, lanolin alcohols, alkanolamides, and the like. Alkanolamides contain at least one alkoxyl or one polyoxyethylene grouping and include alkanol-derived amides, such as acylamide DEA, N-alkyl pyrrolidone, palmamide MEA, peanutamide MIPA, and the like and ethoxylated amides, such as PEG-50 tallow amide. Amine oxides include alkylamine oxides, such as lauramine oxide; and acylamidopropyl morpholine oxides, such as cocamidopropylamine oxide; and the like. Esters include ethoxylated carboxylic acids, such as PEG-8 dilaurate, PEG-8 laurate, and the like; ethoxylated glycerides, such as PEG-4 castor oil, PEG-120 glyceryl stearate, triolein PEG-6 esters, and the like; glycol esters and derivatives thereof, such as glycol stearate SE, propylene glycol ricinoleate, and the like; monoglycerides, such as glyceryl myristate, glyceryl palmitate lactate, and the like; polyglyceryl esters, such as polyglyceryl-6-distearate, polyglyceryl-4 oleyl ether, and the like, polyhydric alcohol esters and ethers, such as methyl gluceth-20 sesquistearate, sucrose distearate; and the like; sorbitan/sorbitol esters, such as polysorbate-60, sorbitan sequiisostearate, and the like; and triesters of phosphoric acid, such as trideceth-3 phosphate, trioleth-8 phosphate, and the like. Ethers include ethoxylated alcohols, such as ceteareth-10, nonoxynol-9, and the like; ethoxylated lanolin, such as PEG-20 lanolin, PPG-12-PEG-65 lanolin oil, and the like; ethoxylated polysiloxanes, such as dimethicone copolyol, and the like; propoxylated POE ethers, such as meroxapol 314, poloxamer 122, PPG-5-ceteth-20, and the like; and alkyl polyglycosides, such as lauryl glucose, and the like.

Nonionic surfactants can be used as emulsifiers, suspending agents, solubilizers, foam boosters, and in some cases, as hydrotropes. Non-limiting examples of generally preferred nonionic surfactants include linear or branched alcohol ethoxylates, $C_8$-$C_{12}$ alkylphenol alkoxylates, such as octylphenol ethoxylates, polyoxyethylene polyoxypropylene block copolymers, and the like; $C_8$-$C_{22}$ fatty acid esters of polyoxyethylene glycol mono- and di-glycerides; sorbitan esters and ethoxylated sorbitan esters; $C_8$-$C_{22}$ fatty acid glycol esters; block copolymers of ethylene oxide and propylene oxide; and the like. Non-limiting examples of surfactant foam boosters or hydrotropes include alkanolamides, such as acetamide MEA, monoethanolamide, diethanolamide, cocamide DEA, isopropanolamide, and the like; amine oxides, such as hydrogenated tallowamine oxide; short chain alkyl aryl sulfonates, such as sodium toluene sulfonate; sulfosuccinates, such as disodium stearyl sulfosuccinate; and the like.

Amphoteric and zwitterionic surfactants are those compounds that have the capacity of behaving either as an acid or a base, by carrying a positive charge in strongly acidic media, carrying a negative charge in strongly basic media, and forming zwitterionic species at intermediate pH. The major classes of amphoteric surfactants are acyl/dialkyl ethylenediamines and derivatives thereof, such as disodium cocoamphocarboxymethylhydroxy-propyl sulfate, disodium cocamphodipropionate, sodium cocoamphoacetate, sodium lauroampho PG-acetatephosphate, sodium tallowamphopropionate, sodium undecylenoamphopropionate, and the like; and N-alkylamino acids, such as aminopropyl laurylglutamide, dihydroxyethyl soya glycinate, lauraminopropionic acid, and the like.

Some suitable zwitterionic surfactants for use in the present compositions include those broadly described as derivatives of aliphatic quaternary ammonium, phosphonium, and sulfonium compounds, wherein which the aliphatic radicals can be straight chain or branched, and wherein one of the aliphatic substituents contains about 8 to about 18 carbon atoms and another substituent contains an anionic water-solubilizing group, such as carboxy, sulfonate, sulfate, phosphate, phosphonate, and the like. Classes of zwitterionics include alkylamino sulfonates, alkyl betaines and alkylamido betaines, such as stearamidopropyldimethylamine, diethylaminoethylstearamide, dimethylstearamine, dimethylsoyamine, soyamine, myristylamine, tridecylamine, ethylstearylamine, N-tallowpropane diamine, ethoxylated (5 moles ethylene oxide) stearylamine, dihydroxy ethyl stearylamine, arachidylbehenylamine, and the like. Some suitable betaine surfactants include but are not limited to alkyl betaines, alkyl amidopropyl betaines, alkyl sulphobetaines, alkyl glycinates, alkyl carboxyglycinates, alkyl amphopropionates, alkyl amidopropyl hydroxysultaines, acyl taurates, and acyl glutamates, wherein the alkyl and acyl groups have from 8 to 18 carbon atoms. Non-limiting examples of preferred amphoteric surfactants include cocamidopropyl betaine, sodium cocoamphoacetate, cocamidopropyl hydroxysultaine, and sodium cocoamphopropionate, which are particularly suitable as mild-type cleansers for skin and hair.

A pH adjusting agent can be added either to a previously acid-swollen, base swollen or water-swollen associative polymer or to a formulation containing an associative polymer embodiment of the invention. Thus, the pH adjusting agent can be utilized in any amount necessary to obtain a desired pH value in the final composition. Non-limiting examples of alkaline pH adjusting agents include alkali metal hydroxides, such as sodium hydroxide, and potassium hydroxide; ammonium hydroxide; organic bases, such as triethanolamine, diisopropylamine, dodecylamine, diisopropanolamine, aminomethyl propanol, cocamine, oleamine, morpholine, triamylamine, triethylamine, tromethamine (2-amino-2-hydroxymethyl)-1,3-propanediol), and tetrakis (hydroxypropyl)ethylenediamine; and alkali metal salts of inorganic acids, such as sodium borate (borax), sodium phosphate, sodium pyrophosphate, and the like, and mixtures thereof. Acidic pH adjusting agents can be organic acids, including amino acids, and inorganic mineral acids. Non-limiting examples of acidic pH adjusting agents include acetic acid, citric acid, fumaric acid, glutamic acid, glycolic acid, hydrochloric acid, lactic acid, nitric acid, phosphoric acid, sodium bisulfate, sulfuric acid, tartaric acid, and the like, and mixtures thereof.

The polymers of the present invention can be used as a thickener, film former, or as a dye or pigment suspending agent for promoting deposition of colorants on hair and skin. Colorants for hair can be temporary, semipermanent or permanent hair dyes or color restorers that pigment the hair gradually. Temporary and semipermanent hair dyes typically are rinses, gels, sprays, shampoos, sticks, and the like, and hair color restorers are typically in the form of hair dressings or emulsions. Permanent hair dyes, and longer-lasting semipermanent hair dyes, are generally two-part products, one part containing the oxidative dye intermediates and dye couplers, and the other part containing stabilized oxidizing agent, usually hydrogen peroxide at about pH 3-4, and are mixed together immediately before use. It is known that such two-part hair dyeing products are formulated with combinations of surfactant ingredients, usually nonionic surfactants or anionic surfactants, to thicken when the dye mixture is prepared. In addition to the foregoing literature, a general discussion of hair dyeing chemistry and compositions is in Brown et al, *SCC Monograph*, "Permanent Hair Dyes", Society of Cosmetic Chemists (1996), incorporated herein by reference. The polymers of the present invention may be incorporated in one or both of the two-parts of such hair dyeing systems, either as the thickener for the acidic stabilized oxidizing portion or in the non-oxidizing portion to be thickened upon mixing with the acidic portion.

In addition to ingredients discussed above, other ingredients commonly used for antiacne products, facial and body hair bleaches, and antiseptic products include oxidizing agents, such as hydrogen peroxide, benzoyl peroxide, and water-soluble inorganic persulfate compounds such as ammonium persulfate, potassium persulfate, and sodium persulfate.

The polymers of the present invention are useful stabilizers of silicone fluids, which are commonly used in shampoo products, such as the so-called "two-in-one" combination cleansing/conditioning shampoos. Silicone fluids are generally described as alkylsiloxane polymers. The most common class of silicone polymers are the linear polydimethyl siloxanes having the general formula $CH_3$—$(Si(CH_3)_2$—$O)_w$—$Si(CH_3)_3$ where w denotes an integer greater than 2. Silicones can also be branched materials wherein one or more alkyl groups in a polymer are replaced with oxygen to create a branch point. Silicone fluids are typically water-insoluble oils having a viscosity in the range of a few mPa·s to several hundred thousand mPa·s.

A particularly useful class of silicones for use in hair care products are the so-called rigid silicones (also known as silicone gums), as described, for example in U.S. Pat. No. 4,902,499, incorporated herein by reference, which generally have a viscosity (at about 20° C.) of greater than about 600,000 mPa·s and have a weight average molecular weight of at least about 500,000 Daltons as determined by intrinsic viscosity measurement. The polymers of the present invention are surprisingly effective for stabilizing two-in-one type shampoo formulations containing rigid silicone conditioning agents.

Another class of silicone materials that are particularly useful in combination with the polymers of the present invention are the volatile silicones, which are often used as lubricants in hair care products, such as shampoos. Volatile silicones include cyclic and linear polydimethylsiloxanes, and the like. Cyclic volatile silicones typically contain about 3 to about 7 silicon atoms, alternating with oxygen atoms, in a cyclic ring structure. Each silicon atom is also substituted with two alkyl groups, typically methyl groups. Linear volatile silicones are silicone fluids, as described above, having viscosities of not more than about 25 mPa·s. A description of volatile silicones is found in Todd and Byers, "Volatile Silicone Fluids for Cosmetics", *Cosmetics and Toiletries*, Vol. 91(1), pp. 27-32 (1976), and in Kasprzak, "Volatile Silicones", *Soap/Cosmetics/Chemical Specialities*, pp. 40-43 (December 1986), each incorporated herein by reference.

Other silicone oils include the dimethicone copolyols, which are linear or branched copolymers of dimethylsiloxane (dimethicone) and alkylene oxides. The dimethicone polyols can be random or block copolymers. A generally useful class of dimethicone polyols are block copolymers having blocks of polydimethylsiloxane and blocks of polyalkylene oxide, such as blocks of polyethylene oxide, polypropylene oxide, or both. Silicone fluids, including volatile silicones, silicone gums, and silicone copolymers, are available from a variety of commercial sources such as Dow Corning, General Electric Company, and Noveon, Inc.

Other oily materials that are useful in combination with the associative polymers of the present invention include, for example, acetylated lanolin alcohols; lanolin alcohol concentrates; esters of lanolin fatty acids such as the isopropyl esters of lanolin fatty acid; polyol fatty acids; ethoxylated alcohols, such as ethoxylate and castor oils; sterols; sterol esters; sterol ethoxylates; and like materials. Many of such esters and ethoxylates are also useful as non-ionic surfactants.

Numerous ingredients are known in the art as conditioning agents for hair or skin, and humectants, and in addition to those previously discussed, non-limiting examples include PCA (DL-pyrrolidone carboxylic acid) and its salts, such as lysine PCA, aluminum PCA, copper PCA, chitosan PCA, and the like, allantoin; urea; hyaluronic acid and its salts; ceramides; sorbic acid and its salts; sugars and starches and derivatives thereof; lactamide MEA; and the like.

The present invention will be better understood by reference to the following examples which serve to describe, but not to limit, the present invention.

EXAMPLE 1

Synthesis of Hydrophobe Group Containing Trithiocarbonate Compounds

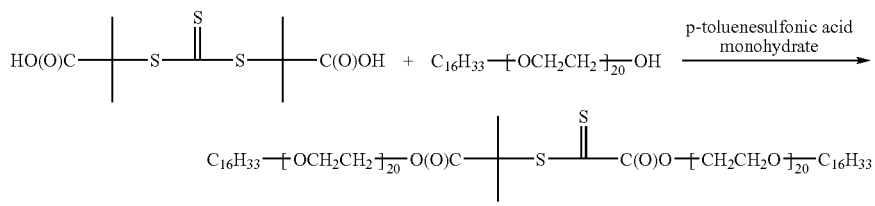

5.78 grams trithiocarbonate, 50 grams Brij® 58 a hydrophobe group containing compound from Uniqema, and 0.5 gram p-toluene sulfonic acid were mixed in a 100 ml round bottom flask with a stirrer and heated to about 130° C. under 60 mmHg vacuum to distill off 0.15 ml water in 30 minutes using a condenser and a receiver. 0.5 g more of the acid was added and the distillation was continued at about 130° C. for 5 more hours to produce the product shown above. The contents of the flask were poured into a reaction vessel and used directly in the polymerization described in Example 2.

EXAMPLE 1B

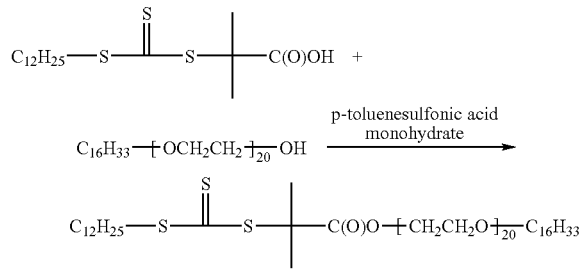

In a 100 ml reaction vessel equipped with a magnetic stirrer, mantle, thermowatch, short-column condenser, cow receiver, and thermometers, 117.97 grams of hydrophobe group containing compound (Brij® 58) and 1.90 grams of p-toluenesulfonic acid monohydrate were added. The reactants were heated to about 80° C. and subsequently 36.4 grams of the trithiocarbonate compound was added. A partial vacuum to 60 mm Hg mercury was applied and the temperature was increased to about 110° C. for a period of five hours to collect water that was formed and produce the product shown above. The product can be used "as is" as in Example 2B, or can be placed into toluene and washed with an aqueous base such as a 10% sodium hydroxide or sodium carbonate solution to remove residual acid catalyst, and then concentrated.

EXAMPLE 2

Polymerization of Hydrophilic Group Containing Repeat Units into Trithiocarbonate Hydrophobe Group Containing Compounds to Form Associative Thickeners

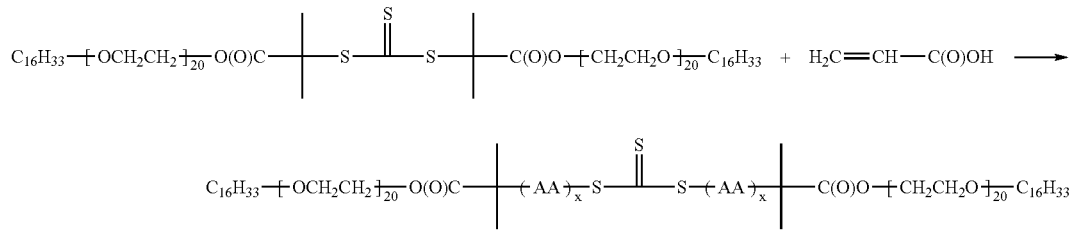

wherein Mn is about 10,000 and -AA- is a repeating unit polymerized from acrylic acid.

59.28 grams crude product from Example 1, and 200 grams acrylic acid were polymerized in a 1 liter round bottom flask with 0.3 gram AIBN and 200 grams t-butyl alcohol at about 80° C. for about 5 hours under nitrogen atmosphere. T-butyl alcohol was removed in a rotary evaporator. 600 ml water was added and the solution was neutralized with 50% NaOH (160 g) to a pH of about 8 to about 9. The viscous aqueous solution was used in the associative thickener evaluation hereinbelow.

EXAMPLE 2B

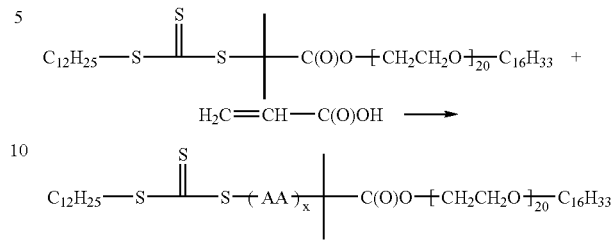

wherein Mn is about 3,743 and -AA- is as defined previously.

In a 500 ml, 3 port reaction vessel equipped with mechanical stirrer, nitrogen blanket, oilbath, j-chem thermocouple unit, and a condenser, 4.9 grams of the hydrophobe group containing trithiocarbonate compound of Example 1B, 45.1 grams acrylic acid, 200 grams of water, and 0.0271 grams 2,2'-azobis(2-methylproprionamidine) dihydrochloride were added. The reactants were heated to about 65° C. until an exotherm reaction took place. Afterwards, the reactants were heated to about 80° C. for a period of about 3 hours. An aqueous NaOH solution was added to adjust the pH to about 8 and the solid content to about 20%.

EXAMPLE 3

Synthesis of Hydrophobe Group Containing Dithiocarbonate Compounds

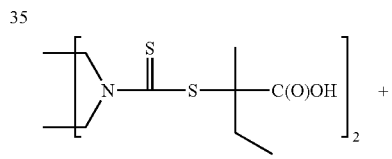

-continued

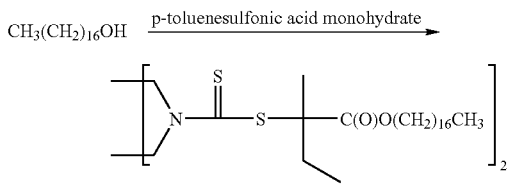

In a 100 ml, 3 port reaction vessel equipped with a mechanical stirrer, mantle, thermowatch, short-column condenser, cow receiver, thermometers, and a nitrogen blanket, 27.68 grams of hydrophobe group containing compound and 4.34 grams of p-toluenesulfonic acid monohydrate were added. The reactants were heated to about 80° C. and 25 grams of the trithiocarbonate compound was added. A partial vacuum to 60 mmHg mercury was applied and the temperature was increased to about 110° C. for a period of five hours to produce the product shown above.

EXAMPLE 4

Polymerization of Acrylic Acid Repeat Units into Hydrophobe Group Containing Dithiocarbonate Compound from Example 3

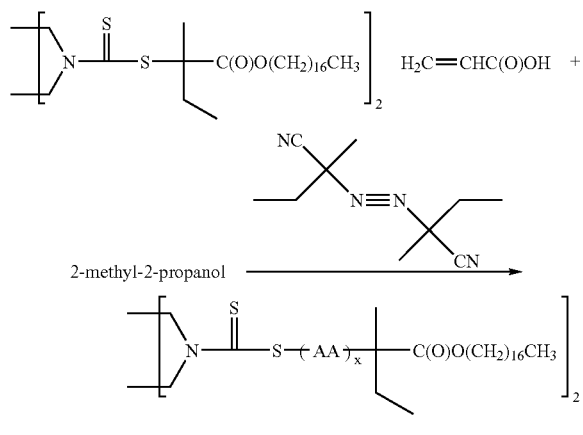

wherein Mn is about 9,113 and -AA- is a repeating unit polymerized from acrylic acid.

In a 150 ml, 3 port reaction vessel equipped with a mechanical stirrer, nitrogen blanket, oilbath, j-chem thermocouple unit, and a condenser, 1.33 grams of the hydrophobe group containing dithiocarbonate compound, 13.67 grams acrylic acid, 15 grams of 2-methyl-2-propanol, and 0.0086 grams Vazo® 67 were added. The reactants were heated to about 65° C. until an exotherm reaction took place. Afterwards, the reactants were heated to about 80° C. for a period of about 7 hours to produce the product shown above.

EXAMPLE 5

Synthesis of Hydrophobe Group Containing Dithiocarbonate Compounds

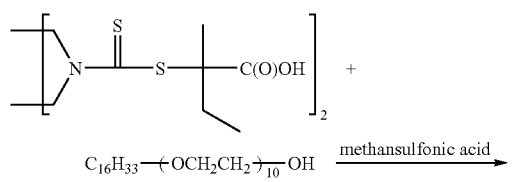

-continued

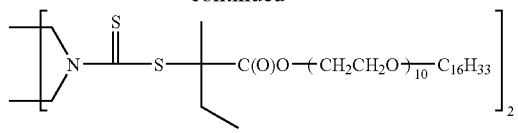

In a 50 ml, 3 port reaction vessel equipped with a mechanical stirrer, mantle, thermowatch, short-column condenser, cow receiver, and thermometers, 6.57 grams of dithiocarbonate, 21.51 grams of hydrophobe Brij® 56, and 0.5 grams of methanesulfonic acid were added. The reactants were heated to about 110° C. until an exotherm reaction took place. A partial vacuum to 60 mmHg mercury was applied and the temperature was increased to about 130° C. for a period of about 5.5 hours to produce the product shown above.

EXAMPLE 6

Polymerization of Acrylic Acid Repeat Units into Hydrophobe Group Containing Dithiocarbonate Compound from Example 5

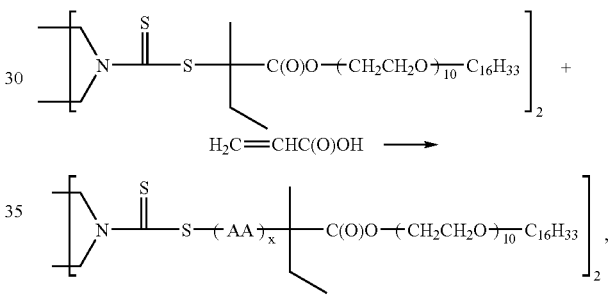

wherein Mn is about 25,000 and -AA- is a repeating unit polymerized from acrylic acid.

In a 250 ml, 3 port reaction vessel equipped with mechanical stirrer, nitrogen blanket, oilbath, j-chem thermocouple unit, and a condenser, 1.67 grams of the hydrophobe group containing dithiocarbonate compound, 20 grams acrylic acid, 86.68 grams of water, and 0.013 grams 2,2'-azobis(2-methylproprionamidine) dihydrochloride were added. The reactants were heated to about 65° C. until an exotherm reaction took place. Afterwards, the reactants were heated to a controlled temperature of about 66° C. for a period of about 5.5 hours to produce the product shown above.

EXAMPLE 7

Polymerization of Acrylic Acid Repeat Units into Hydrophobe Group Containing Dithiocarbonate Compound from Example 5

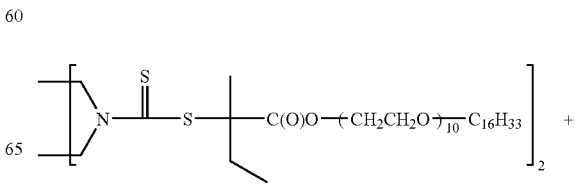

-continued

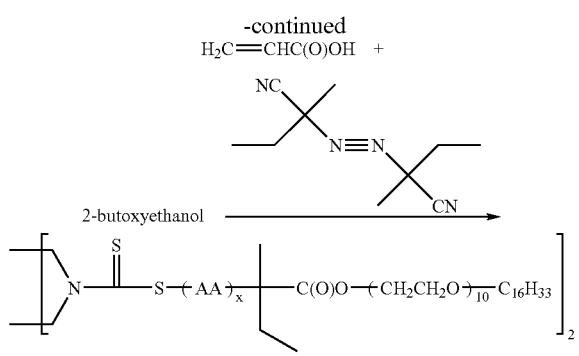

wherein Mn is about 10,500 and -AA- is a repeating unit polymerized from acrylic acid.

In a 150 ml, 3 port reaction vessel equipped with a mechanical stirrer, nitrogen blanket, oilbath, j-chem thermocouple unit, and a condenser, 4.21 grams of the hydrophobe group containing dithiocarbonate compound, 20.79 grams acrylic acid, 25 grams of 2-butoxyethanol, and 0.01 grams Vazo® 67 (catalyst shown above) were added. The reactants were heated to about 65° C. until an exotherm reaction took place. Afterwards, the reactants were heated to about 82° C. for a period of about 6 hours to produce the product shown above.

EXAMPLE 8

Polymerization of Acrylic Acid Repeat Units into Hydrophobe Group Containing Dithiocarbonate Compound from Example 5

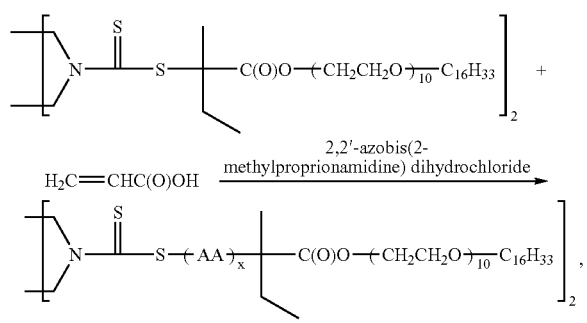

wherein Mn is about 15,000 and -AA- represents a repeating unit polymerized from acrylic acid.

In a 250 ml, 3 port reaction vessel equipped with mechanical stirrer, nitrogen blanket, oil bath, j-chem thermocouple unit, and a condenser, 2.93 grams of the hydrophobe group containing trithiocarbonate compound, 20 grams acrylic acid, 91.71 grams of water, and 0.013 grams 2,2'-azobis(2-methylproprionamidine) dihydrochloride were added. The reactants were heated to about 65° C. for about 5 hours to produce the product shown above.

Confirmation of Viscosity Enhancing Properties

In order to illustrate the viscosity enhancing properties of the associative thickeners of the present invention, the Example 2B associative thickener trithiocarbonate polymer containing acrylic acid repeat units and hydrophobic terminal groups was added in various amounts to the aqueous latex paint composition (244.565 g) listed in Table 3. The thickening ability of the compound is documented in Table 1 set forth hereinbelow.

TABLE 1

| ASSOCIATIVE THICKENER | | | ICI | KU Value |
|---|---|---|---|---|
| active parts per 100 parts of aqueous composition | active weight | grams | Value (poise) | (Krebs unit) |
| 0.37 | 20% | 4.5 | 0.4 | 65.7 |
| 0.68 | 20% | 8.3 | 0.7 | 95.2 |
| 0.89 | 20% | 10.9 | 1.6 | 110.0 |

As shown in the above table, when the amount of the associative thickener is increased, both the ICI, high shear viscosity, and KU, low shear viscosity, values increase which indicate viscosity increases due to the associative thickening properties of the polymer.

Table 2 illustrates comparison of various associative thickeners of the present invention with prior art control thickeners, with Control 1 being a commercial hydrophobically-modified ethoxylated urethanes (HEURs) associative thickener and Control 2 being a commercial hydrophobically-modified alkali-swellable emulsions (HASE) polyacrylate associative thickener. Table 2 sets forth the amount of the active thickener present in an associative thickener composition which is added to the aqueous latex paint formulation set forth in Table 3. As illustrated in Table 2, the associative thickeners of the present invention produced excellent high shear viscosity and low shear viscosity value comparable or better than the prior art controls.

TABLE 2

Comparison of Associative Thickeners

| ASSOCIATIVE THICKENER | | | | |
|---|---|---|---|---|
| Active parts per 100 parts of aqueous composition | active weight | grams | ICI Value (poise) | KU Value (Krebs unit) |
| Example 2 | 1.08 | 10% | 26.6 | 1.0 | 68.4 |
| Example 4 | 1.08 | 10% | 26.6 | 1.9 | 105.8 |
| Example 6 | 0.61 | 10% | 15 | 1.2 | 128.5 |
| Example 7 | 0.57 | 10% | 14 | 1.2 | 108.6 |
| Example 8 | 0.61 | 10% | 15 | 1.3 | 138.2 |
| Control 1- Aquaaflow NHS[a] 300 (HEUR) | 0.37 | 20% | 4.5 | 2.0 | 102.5 |
| Control 2- (HASE) | 0.38 | 30% | 3.1 | 0.7 | >145 |

[a]Hercules Corp.

Table 3 represents a standard aqueous latex paint formulation utilized in the industry to produce a high gloss paint. In the noted examples above, the associative thickeners were added to this composition in various amounts to illustrate the thickening abilities and effects on viscosity by the compounds of the present invention.

TABLE 3

| Base Paint Composition Used in Examples | |
|---|---|
| Ethylene Glycol | 8.875 |
| TiO$_2$ Pigment (Kronos 4311) | 79.05 |
| Water | 1.59 |

TABLE 3-continued

Base Paint Composition Used in Examples

| | |
|---|---|
| Defoamer (Foamstar A34) | 0.25 |
| Solvent (DB) | 1.9 |
| Neutralizer (AMP 95) | 0.6 |
| Dispersant (BYK 333) | 0.075 |
| Premix top 7 | |
| Add | |
| Styrene acrylate latex (Carboset 7705) | 143.40 |
| Defoamer (Foamstar A34) | 0.725 |
| Water | 2.4 |
| Mix 5 minutes | |
| Add | |
| Solvent (alcohol) (Texanol) | 0.95 |
| Mix 5 minutes | |
| Biocide (Proxcel GXL) | 0.25 |
| Biocide (Troy P20T) | 0.825 |
| Defoamer (BYK 024) | 0.475 |
| Dispersant (Tamol 165A) | 0.475 |
| Plasticizer (Carbowax 200) | 2.25 |
| Defoamer (BYK 024) (REPEAT?) | 0.475 |
| Associative Thickener | Varied |
| Total | 244.565 + associative thickener weight |
| Premix top 6 | Add and mix for 5 minutes |

Table 4 illustrates the increase in viscosity of the aqueous latex paint composition of Table 3 when an increasing amount of different associative thickeners are utilized therein. The results illustrate that the associative thickeners of the present invention can be used to effectively modify the viscosity of various compositions.

TABLE 4

EFFECT OF VARYING AMOUNTS OF ASSOCIATIVE THICKENER ON VISCOSITY

ASSOCIATIVE THICKENER

| | Active parts per 100 parts of aqueous paint composition | Percent active thickener | Grams total thickener composition | ICI Value (poise) | KU Value (Krebs unit) |
|---|---|---|---|---|---|
| Example 8 | 0.41 | 10% | 10 | 0.9 | 116.4 |
| Example 8 | 0.61 | 10% | 15 | 1.3 | 138.2 |
| Example 8 | 0.82 | 10% | 20 | 1.5 | Too thick |
| Example 6 | 0.41 | 10% | 10 | 0.9 | 108.5 |
| Example 6 | 0.61 | 10% | 15 | 1.2 | 128.5 |
| Example 6 | 0.82 | 10% | 20 | 1.5 | Too thick |

In accordance with the patent statutes, the best mode and preferred embodiment have been set forth, the scope of the invention is not limited thereto, but rather by the scope of the attached claims.

What is claimed is:

1. An aqueous composition, comprising:
A) water;
B) a latex polymer or copolymer; and
C) an associative thickener comprising a reaction product polymerized from a) at least one hydrophobe group containing monomer; b) at least one hydrophilic group containing monomer; c) optionally at least one other monomer selected from branched and unbranched ($C_1$ to $C_8$) alkyl esters of (meth)acrylic acid, vinyl acetate; styrene; diene monomers having a total of from 4 to 12 carbon atoms, α-methyl styrene; and $C_1$ to $C_{12}$ alkyl styrenes with substituent groups either on the main alkyl chain or on the ring or both;

and d) a compound having the formula:

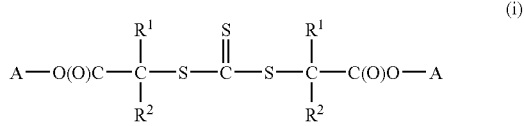

(i)

wherein A independently represents hydrogen or a group represented by the formulae:

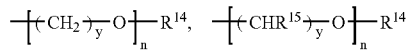

wherein $R^{14}$ is an alkyl group having from about 3 to about 50 carbon atoms; $R^1$ and $R^2$, independently, is a linear or branched alkyl having from 1 to about 6 carbon atoms, or a substituted $C_1$ to about $C_6$ alkyl having one or more substituents, or one or more aryls, or a substituted aryl having from 1 to 6 substituents on the aryl ring; or wherein $R^1$ and $R^2$ are part of a substituted or unsubstituted cyclic ring having from about 5 to about 12 total carbon atoms; wherein said one or more substituents, independently, comprise an alkyl having from 1 to 6 carbon atoms, or an aryl, or a halogen which can be the same or different, or a cyano, or an ether having a total of from 2 to about 20 carbon atoms, or a nitro group, or combinations thereof; or

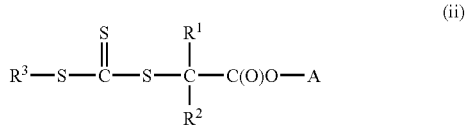

(ii)

wherein A is as defined above; $R^3$ is benzyl, a $C_1$ to $C_{18}$ alkyl, or a substituted $C_1$ to $C_{18}$ alkyl wherein said substituted group is halogen, hydroxyl, or alkoxy, or a $C_1$ to $C_{18}$ hydroxyalkyl, aralkyl, cyanoalkyl, aminoalkyl, carboxylalkyl, carboalkoxyalkyl, or mercaptoalkyl, and wherein $R^1$ and $R^2$, independently, are as set forth above; or

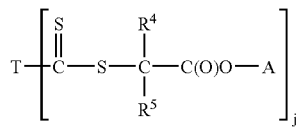

(iii)

wherein A is as defined above; j is 1 or 2, with the proviso that when j is 1, T is ($-NR^6R^7$), and when j is 2, T is a divalent radical having a nitrogen atom directly connected to each carbon atom of the two thiocarbonyl groups;

wherein $R^4$ and $R^5$, independently, is the same or different, is optionally substituted as defined for $R^1$ and $R^2$, and is a linear or branched alkyl having from 1 to about 12 carbon atoms; or an aryl group having from 6 to about 18 carbon atoms, optionally containing heteroatoms; or $R^4$ and $R^5$ can form and be part of a substituted or unsubstituted cyclic ring having from 3 to about 12 carbon atoms;

wherein $R^6$ and $R^7$, independently, is the same or different, optionally substituted as defined for $R^1$ and $R^2$, optionally contains heteroatoms, and is hydrogen; or a linear or branched alkyl having from 1 to about 18 carbons; or an aryl group or an aryl alkyl group having from 6 to about 18 carbon atoms, optionally saturated or unsaturated; or an arylalkyl having from 7 to about 18 carbons; or an alkenealkyl having from 3 to about 18 carbon atoms; or derived from polyalkylene glycol ether; or derived from an amine; or $R^6$ and $R^7$ are in the form of a substituted or unsubstituted cyclic ring with the nitrogen atom having a total of 4 to about 12 carbon atoms; or

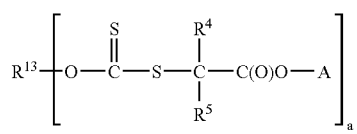

(iv)

wherein A is as defined above; $R^4$ and $R^5$ are as defined above, wherein $R^{13}$ is optionally substituted, and is a linear or branched alkyl having from 1 to about 12 carbon atoms, an aryl group optionally saturated or unsaturated; an arylalkyl having from about 7 to about 18 carbon atoms; an acyl group; an alkene group; an alkenealkyl having from 3 to about 18 carbon atoms; an alkylene group; an alkoxyalkyl; derived from a polyalkylene glycol; derived from a polyalkylene glycol monoalkyl ether having from about 3 to about 200 carbon atoms; derived from a polyalkylene glycol monoaryl ether having from about 3 to about 200 carbon atoms, a polyfluoroalkyl; a phosphorous containing alkyl; or a substituted or unsubstituted aryl ring containing heteroatoms, wherein the $R^{13}$ substituents comprise an alkyl having from 1 to 6 carbon atoms; an aryl; a halogen such as fluorine or chlorine; a cyano group; an amino group; an alkene group; an alkoxycarbonyl group; an aryloxycarbonyl group; a carboxy group; an acyloxy group; a carbamoyl group; an alkylcarbonyl group; an alkylarylcarbonyl group; an arylcarbonyl group; an arylalkylcarbonyl group; a phthalimido group; a maleimido group; a succinimido group; amidino group; guanidimo group; allyl group; epoxy group; alkoxy group; an alkali metal salt; a cationic substituent; a hydroxyl group; an ether having a total of from 2 to about 20 carbon atoms; a nitro; sulfur; phosphorous; a carboalkoxy group; a heterocyclic group containing one or more sulfur, oxygen or nitrogen atoms, or combinations thereof wherein said "a" is 1 to about 4.

2. The aqueous composition according to claim 1, wherein said hydrophobe group containing monomer is selected from at least one monomer represented by the formula:

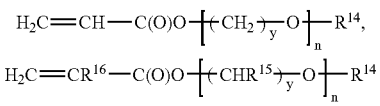

wherein $R^{14}$ is an alkyl group having from about 3 to about 50 carbon atoms, wherein each $R^{15}$, independently is hydrogen or an alkyl group of from 1 to about 2 carbon atoms, wherein $R^{16}$ is hydrogen or a methyl group, wherein y is from 1 to about 12, and wherein each n is the same or different and is 0 to about 200.

3. The aqueous corriposition according to claim 1, wherein said hydrophilic group containing monomer is acrylic acid; methacrylic acid; a (meth)acrylic acid salt; acrylamide; methacrylamide; a dialkylaminoalkyl acrylate with each alkyl, independently, having from 1 to about 6 carbon atoms, and salt thereof, a dialkylaminoalkyl methacrylate with each alkyl, independently, having from 1 to about 6 carbon atoms, and salt thereof; a hydroxyalkyl acrylate with the alkyl having from 1 to about 6 carbon atoms; a hydroxyalkyl methacrylate with the alkyl having from 1 to about 6 carbon atoms; a maleic acid, itaconic acid, crotonic acid, oleic acid, cinnamic acid or salt thereof; styrene sulfonic acid or salt; 2-acrylamido-2-methylpropane sulfonic acid or salt thereof; and combinations thereof.

4. The aqueous composition according to claim 1, wherein $R^1$ and $R^2$ are, independently, said alkyl or said substituted alkyl having one or more substituents, or said one or more aryls, or said substituted aryl having one or more substituents, or combinations thereof, wherein j is 1, wherein $R^4$ and $R^5$, independently, is a phenyl group, or an alkyl group having 1 to about 10 carbon atoms, or wherein $R^4$ and $R^5$ are part of said cyclic ring; wherein $R^6$ and $R^7$, independently, is a phenyl group, or an alkyl group having from 1 to about 10 carbon atoms, or hexamethylene, wherein $R^6$ and $R^7$ are part of said cyclic ring, or wherein j is 2 and T is:

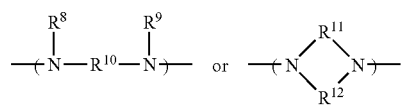

wherein $R^8$ and $R^9$, independently, is the same or different, is optionally substituted, and is hydrogen; a linear or branched alkyl having from 1 to about 18 carbon atoms; or an aryl group having from about 6 to about 18 carbon atoms; or an arylalkyl having from 7 to about 18 carbon atoms; or a alkenealkyl having from 3 to about 18 carbon atoms;

wherein $R^{10}$ is optionally substituted, or is non-existent; or an alkylene group having from 1 to about 18 carbon atoms; or derived from a polyalkylene glycol either having from 3 to about 200 carbon atoms; and wherein $R^{11}$ and $R^{12}$, independently, is the same or different, and is optionally substituted, and is an alkylene group having from 1 to about 4 carbon atoms, or T is

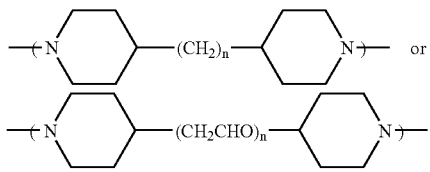

wherein n is 0 or 1 to about 18.

5. The aqueous composition according to claim 4, wherein $R^1$ and $R^2$ are, independently, said methyl group or said phenyl group,
wherein $R^6$ and $R^7$, independently, is said phenyl group, or said alkyl group having from 1 to about 10 carbon atoms, or hexamethylene, or wherein $R^6$ and $R^7$ are part of said cyclic ring, and wherein said "a" is 1 or 2.

6. The aqueous composition according to claim 2, wherein $R^{14}$ is from about 6 to about 30 carbon atoms, wherein y is 2 to about 6 carbon atoms, and wherein n is 0 or 1 to about 50 carbon atoms.

7. The aqueous composition according to claim 1, wherein the associative thickener is present in an amount from about 0.01 to about 5 parts active weight per 100 parts by weight of the aqueous composition.

8. The aqueous composition according to claim 7, wherein the associative thickener is present in an amount from about 0.05 to about 1.5 parts active weight per 100 parts by weight of the aqueous composition.

9. A process for preparing a thickened aqueous composition, comprising the step of:
mixing water, a latex polymer or copolyrner, and an associative thickener comprising a reaction product derived from at least one a) hydrophobe group containing monomer; b) hydrophilic group containing monomer; c) optionally at least one other monomer selected from branched and unbranched ($C_1$ to $C_8$) alkyl esters of(meth)acrylic acid, vinyl acetate; styrene; diene monomers having a total of from 4 to 12 carbon atoms, α-methyl styrene; and $C_1$ to $C_{12}$ alkyl styrenes with substituent groups either on the main alkyl chain or on the ring or both; and d) a compound having the formula:

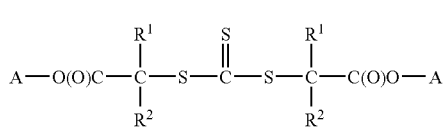

wherein A independently represents hydrogen or a group represented by the formulae:

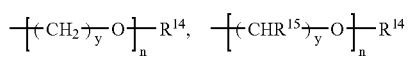

wherein $R^{14}$ an alkyl group having from about 3 to about 50 carbon atoms; wherein $R^1$ and $R^2$, independently, is a linear or branched alkyl having from 1 to about 6 carbon atoms, or a substituted $C_1$ to about $C_6$ alkyl having one or more substituents, or one or more aryls, or a substituted aryl having from 1 to 6 substituents on the aryl ring; or wherein $R^1$ and $R^2$ are part of a substituted or unsubstituted cyclic ring having from about 5 to about 12 total carbon atoms; wherein said one or more substituents, independently, comprise an alkyl having from 1 to 6 carbon atoms, or an aryl, or a halogen which can be the same or different, or a cyano, or an ether having a total of from 2 to about 20 carbon atoms, or a nitro group, or combinations thereof; or

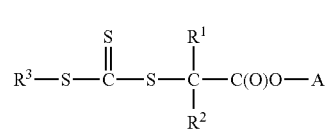

wherein A is as defined above; $R^3$ is benzyl, a $C_1$ through $C_{18}$ alkyl, or a substituted $C_1$ to $C_{18}$ alkyl wherein said substituted group is halogen, hydroxyl, or alkoxy, or a $C_1$ to $C_{18}$ hydroxyalkyl, aralkyl, cyanoalkyl, aminoalkyl, carboxylalkyl, carboalkoxyalkyl, or mercaptoalkyl, and wherein $R^1$ and $R^2$, independently, are as set forth above; or

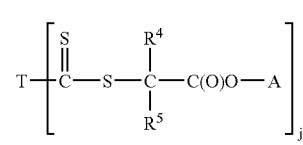

wherein A is as defined above; j is 1 or 2, with the proviso that when j is 1, T is (—$NR^6R^7$), and when j is 2, T is a divalent radical having a nitrogen atom directly connected to each carbon atom of the two thiocarbonyl groups;
wherein $R^4$ and $R^5$, independently, is the same or different, is optionally substituted as defined for $R^1$ and $R^2$, and is a linear or branched alkyl having froin Ito about 12 carbon atoms; or an aryl group having from 6 to about 18 carbon atoms, optionally containing heteroatoms; or $R^4$ and $R^5$ can form and be part of a substituted or unsubstituted cyclic ring having from 3 to about 12 carbon atoms;
wherein $R^6$ and $R^7$, independently, is the same or different, optionally substituted as defined for $R^1$ and $R^2$, optionally contains heteroatoms, and is hydrogen; or a linear or branched alkyl having from 1 to about 18 carbons; or an aryl group or an aryl alkyl group having from 6 to about 18 carbon atoms, optionally saturated or unsaturated; or an arylalkyl having from 7 to about 18 carbons; or an alkenealkyl having from 3 to about 18 carbon atoms; or derived from polyalkylene glycol ether; or derived from an amine; or $R^6$ and $R^7$ are in the form of a substituted or unsubstituted cyclic ring with the nitrogen atom having a total of 4 to about 12 carbon atoms; or

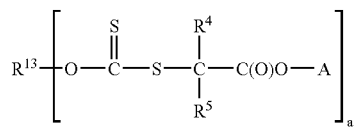

(iv)

wherein A is as defined above; $R^4$ and $R^5$ are as defined above, wherein $R^{13}$ optionally substituted, and is a linear or branched alkyl having from 1 to about 12 carbon atoms, an aryl group optionally saturated or unsaturated; an arylalkyl having from about 7 to about 18 carbon atoms; an acyl group; an alkene group; an alkenealkyl having from 3 to about 18 carbon atoms; an alkylene group; an alkoxyalkyl; derived from a polyalkylene glycol; derived from a polyalkylene glycol monoalkyl ether having from about 3 to about 200 carbon atoms; derived from a polyalkylene glycol monoaryl ether having from about 3 to about 200 carbon atoms, a polyfluoroalkyl; a phosphorous containing alkyl; or a substituted or unsubstituted aryl ring containing heteroatoms, wherein the $R^{13}$ substituents comprise an alkyl having from 1 to 6 carbon atoms; an aryl; a halogen such as fluorine or chlorine; a cyano group; an amino group; an alkene group; an alkoxycarbonyl group; an aryloxycarbonyl group; a carboxy group; an acyloxy group; a carbamoyl group; an alkylcarbonyl group; an alkylarylcarbonyl group; an arylcarbonyl group; an arylalkylcarbonyl group; a phthalimido group; a maleimido group; a succinimido group; amidino group; guanidimo group; allyl group; epoxy group; alkoxy group; an alkali metal salt; a cationic substituent such as a quaternary ammonium salt; a hydroxyl group; an ether having a total of from 2 to about 20 carbon atonis such as methoxy, or hexanoxy; a nitro; sulfur; phosphorous; a carboalkoxy group; a heterocyclic group containing one or more sulfur, oxygen or nitrogen atoms, or combinations thereof, wherein said "a" is 1 to about 4.

10. The process according to claim 9, wherein said hydrophobe group containing monomer is selected from at least one monomer represented by the formula:

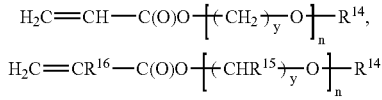

wherein $R^{14}$ is an alkyl group having from about 3 to about 50 carbon atoms, wherein each $R^{15}$, independently is hydrogen or an alkyl group of from 1 to about 2 carbon atoms, wherein $R^{16}$ is hydrogen or a methyl group, wherein y is from 1 to about 12, and wherein each n is the same or different and is 0 to about 200.

11. The process according to claim 9, wherein said hydrophilic group containing monomer is acrylic acid; methacrylic acid; a (meth)acrylic acid salt; acrylamide; methacrylamide; a dialkylaminoalkyl acrylate with each alkyl, independently, having from 1 to about 6 carbon atoms, or salt thereof; a dialkylaminoalkyl methacrylate with each alkyl, independently, having from 1 to about 6 carbon atoms, or salt thereof; a hydroxyalkyl acrylate with the alkyl having from 1 to about 6 carbon atoms; a hydroxyalkyl methacrylate with the alkyl having from 1 to about 6 carbon atoms; a maleic acid, itaconic acid, crotonic acid, oleic acid, cinnamic acid or salt thereof; styrene sulfonic acid or salt; 2-acrylamido-2-methylpropane sulfonic acid or salt thereof; and combinations thereof.

12. The process according to claim 9, wherein $R^1$ and $R^2$ are, independently, said alkyl or said substituted alkyl having one or more substituents, or said one or more aryls, or said substituted aryl having one or more substituents, or combinations thereof, wherein j is 1, wherein $R^4$ and $R^5$, independently, is a phenyl group, or an alkyl group having 1 to about 10 carbon atoms, or wherein $R^4$ and $R^5$ are part of said cyclic ring; wherein $R^6$ and $R^7$, independently, is a phenyl group, or an alkyl group having from 1 to about 10 carbon atoms, or hexamethylene, wherein $R^6$ and $R^7$ are part of said cyclic ring, or wherein j is 2 and T is:

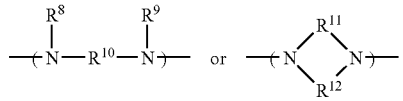

wherein $R^8$ and $R^9$, independently, is the same or different, is optionally substituted, and is hydrogen; a linear or branched alkyl having from 1 to about 18 carbon atoms; or an aryl group having from about 6 to about 18 carbon atoms; or an arylalkyl having from 7 to about 18 carbon atoms; or a alkenealkyl having from 3 to about 18 carbon atoms;

wherein $R^{10}$ is optionally substituted, or is non-existent; or an alkylene group having from 1 to about 18 carbon atoms; or derived from a polyalkylene glycol either having from 3 to about 200 carbon atoms; and wherein $R^{11}$ and $R^{12}$, independently, is the same or different, and is optionally substituted, and is an alkylene group having from 1 to about 4 carbon atoms, or T is

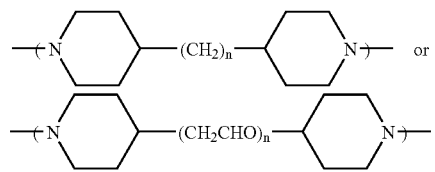

wherein n is 0 or 1 to about 18.

13. The process according to claim 12, wherein $R^1$ and $R^2$ are, independently, said methyl group or said phenyl group, wherein $R^6$ and $R^7$, independently, is said phenyl group, or said alkyl group having from 1 to about 10 carbon atoms, or hexamethylene, or wherein $R^6$ and $R^7$ are part of said cyclic ring, and wherein said "a" is 1 or 2.

14. The process according to claim 10, wherein $R^{14}$ is from about 6 to about 30 carbon atoms, wherein y is 2 to about 6 carbon atoms, and wherein n is 0 or 1 to about 50 carbon atoms.

15. An aqueous composition comprising:
a) an associative polymer thickener comprising a reaction product polymerized from at least a) a hydrophobe group containing monomer; b) a hydrophilic group containing monomer; c) optionally at least one other monomer selected from branched and unbranched ($C_1$ to $C_8$) alkyl esters of (meth)acrylic acid, vinyl acetate; styrene; diene monomers having a total of from 4 to 12 carbon atoms, α-methyl styrene; and $C_1$ to $C_{12}$ alkyl styrenes with substituent groups either on the main alkyl chain or on the ring or both; and d) a compound having the formula:

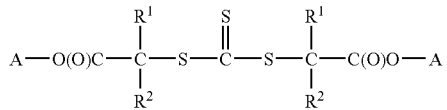

wherein A independently represents hydrogen or a group represented by the formulae:

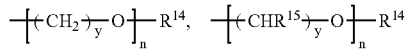

wherein $R^{14}$ is an alkyl group having from about 3 to about 50 carbon atoms; $R^1$ and $R^2$, independently, is a linear or branched alkyl having from 1 to about 6 carbon atoms, or a substituted $C_1$ to about $C_6$ alkyl having one or more substituents, or one or more aryls, or a substituted aryl having from 1 to 6 substituents on the aryl ring; or wherein $R^1$ and $R^2$ are part of a substituted or unsubstituted cyclic ring having from about 5 to about 12 total carbon atoms; wherein said one or more substituents, independently, comprise an alkyl having from 1 to 6 carbon atoms, or an aryl, or a halogen which can be the same or different, or a cyano, or an ether having a total of from 2 to about 20 carbon atoms, or a nitro group, or combinations thereof; or

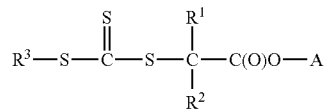

wherein A is as defined above; $R^3$ is benzyl, a $C_1$ to $C_{18}$ alkyl, or a substituted $C_1$ to $C_{18}$ alkyl wherein said substituted group is halogen, hydroxyl, or alkoxy, or a $C_1$ to $C_{18}$ hydroxyalkyl, aralkyl, cyanoalkyl, aminoalkyl, carboxylalkyl, carboalkoxyalkyl, or mercaptoalkyl, and wherein $R^1$ and $R^2$, independently, are as set forth above; or

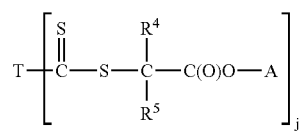

wherein A is as defined above; j is 1 or 2, with the proviso that when j is 1, T is ($-NR^6R^7$), and when j is 2, T is a divalent radical having a nitrogen atom directly connected to each carbon atom of the two thiocarbonyl groups;
wherein $R^4$ and $R^5$, independently, is the same or different, is optionally substituted as defined for $R^1$ and $R^2$, and is a linear or branched alkyl having from 1 to about 12 carbon atoms; or an aryl group having from 6 to about 18 carbon atoms, optionally containing heteroatoms; or $R^4$ $R^5$ can form and be part of a substituted or unsubstituted cyclic ring having from 3 to about 12 carbon atoms;
wherein $R^6$ and $R^7$, independently, is the same or different, optionally substituted as defined for $R^1$ and $R^2$, optionally contains heteroatoms, and is hydrogen; or a linear or branched alkyl having from 1 to about 18 carbons; or an aryl group or an aryl alkyl group having from 6 to about 18 carbon atoms, optionally saturated or unsaturated; or an arylalkyl having from 7 to about 18 carbons; or an alkenealkyl having from 3 to about 18 carbon atoms; or derived from polyalkylene glycol ether; or derived from an amine; or $R^6$ and $R^7$ are in the form of a substituted or unsubstituted cyclic ring with the nitrogen atom having a total of 4 to about 12 carbon atoms; or

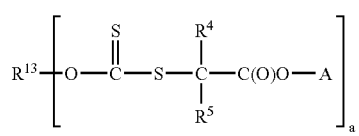

wherein A is as defined above; $R^4$ and $R^5$ are as defined above, wherein $R^{13}$ is optionally substituted, and is a linear or branched alkyl having from 1 to about 12 carbon atoms, an aryl group optionally saturated or unsaturated; an arylalkyl having from about 7 to about 18 carbon atoms; an acyl group; an alkene group; an alkenealkyl having from 3 to about 18 carbon atoms; an alkylene group; an alkoxyalkyl; derived from a polyalkylene glycol; derived from a polyalkylene glycol monoalkyl ether having from about 3 to about 200 carbon atoms; derived from a polyalkylene glycol monoaryl ether having from about 3 to about 200 carbon atoms, a polyfluoroalkyl; a phosphorous containing alkyl; or a substituted or unsubstituted aryl ring containing heteroatoms, wherein the $R^{13}$ substituents comprise an alkyl having from 1 to 6 carbon atoms; an aryl; a halogen such as fluorine or chlorine; a cyano group; an amino group; an alkene group; an alkoxycarbonyl group; an aryloxycarbonyl group; a carboxy group; an acyloxy group; a carbamoyl group; an alkylcarbonyl group; an alkylarylcarbonyl group; an arylcarbonyl group; an arylalkylcarbonyl group; a phthalimido group; a maleimido group; a succinimido group; amidino group; guanidimo group; allyl group; epoxy group; alkoxy group; an alkali metal salt; a cationic substituent; a hydroxyl group; an ether having a total of from 2 to about 20 carbon atoms; a nitro; sulfur; phosphorous; a carboalkoxy group; a heterocyclic group containing one or more sulfur, oxygen or nitrogen atoms, or combinations thereof, wherein said "a" is 1 to about 4; and
b) one or more components selected from chelators, conditioners, diluents, fragrances, pigments, dyes, colorings, antioxidants, humectants, skin and hair conditioners, auxiliary fixatives, auxiliary rheology modifying agents, silicone oil, silicone fluids, moisturizers, plasticizers, pearlizing agents, oxidizing agents, reducing agents, lubricants, moisture barriers, emollients, emulsifiers, neutralizers, opacifiers, pharmaceutical actives, preservatives, solvents, spreading aids, sunscreens, surfactants, conditioning polymers, vitamins, viscosity adjusters, proteins, protein derivatives, antimicrobial agents, antifungal agents, botanicals, UV absorbing agents, antidandruff agents, anticaries agents, antitartar agents, abrasives, pH adjusting agents, buffering agents, hydrotropes, electrolytes, waxes, antistatic agents, synthetic oils, vegetable oils, animal oils, monomeric quaternized ammonium compounds, polymeric quaternized ammonium compounds, propellants, and anti-acne agents.

16. The aqueous composition according to claim 15, wherein said hydrophobe group containing monomer is selected from at least one monomer represented by the formulae:

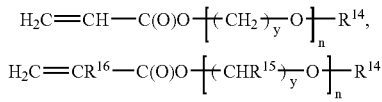

wherein $R^{14}$ is an alkyl group having from about 3 to about 50 carbon atoms, wherein each $R^{15}$, independently is hydrogen or an alkyl group of from 1 to about 2 carbon atoms, wherein $R^{16}$ is hydrogen or a methyl group, wherein y is from 1 to about 12, and wherein each n is the same or different and is 0 to about 200.

17. The aqueous composition according to claim 15, wherein said hydrophilic group containing monomer is acrylic acid; methacrylic acid; a (meth)acrylic acid salt; acrylamide; methacrylamide; a dialkylaminoalkyl acrylate with each alkyl, independently, having from 1 to about 6 carbon atoms, or salt thereof; a dialkylaminoalkyl methacrylate with each alkyl, independently, having from 1 to about 6 carbon atoms, or salt thereof, a hydroxyalkyl acrylate with the alkyl having from 1 to about 6 carbon atoms; a hydroxyalkyl methacrylate with the alkyl having from 1 to about 6 carbon atoms; a maleic acid, itaconic acid, crotonic acid, oleic acid, cinnamic acid or salt thereof, styrene sulfonic acid or salt; 2-acrylamido-2-methylpropane sulfonic acid or salt thereof; and combinations thereof.

18. The aqueous composition according to claim 15, wherein $R^1$ and $R^2$ are, independently, said alkyl or said substituted alkyl having one or more substituents, or said one or more aryls, or said substituted aryl having one or more substituents, or combinations thereof,
wherein j is 1, wherein $R^4$ and $R^5$, independently, is a phenyl group, or an alkyl group having 1 to about 10 carbon atoms, or wherein $R^4$ and $R^5$ are part of said cyclic ring; wherein $R^6$ and $R^7$, independently, is a phenyl group, or an alkyl group having from 1 to about 10 carbon atoms, or hexanmethylene, wherein $R^6$ and $R^7$ are part of said cyclic ring, or
wherein j is 2 and T is:

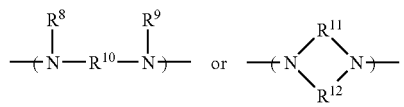

wherein $R^8$ and $R^9$, independently, is the same or different, is optionally substituted, and is hydrogen; a linear or branched alkyl having from 1 to about 18 carbon atoms; or an aryl group having from about 6 to about 18 carbon atoms; or an arylalkyl having from 7 to about 18 carbon atoms; or a alkenealkyl having from 3 to about 18 carbon atoms;
wherein $R^{10}$ is optionally substituted, or is non-existent; or an alkylene group having from 1 to about 18 carbon atoms; or derived from a polyalkylene glycol either having from 3 to about 200 carbon atoms; and wherein $R^{11}$ and $R^{12}$, independently, is the same or different, and is optionally substituted, and is an alkylene group having from 1 to about 4 carbon atoms, or T is

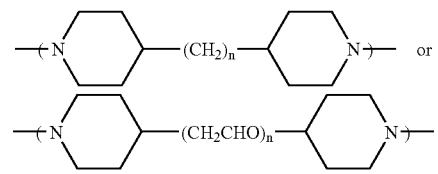

wherein n is 0 or 1 to about 18.

19. The aqueous composition according to claim 18, wherein $R^1$ and $R^2$ are, independently, said methyl group or said phenyl group,
wherein $R^6$ and $R^7$, independently, is said phenyl group, or said alkyl group having from 1 to about 10 carbon atoms, or hexamethylene, or wherein $R^6$ and $R^7$ are part of said cyclic ring, and wherein said "a" is 1 or 2.

20. The aqueous composition according to claim 16, wherein $R^{14}$ is from about 6 to about 30 carbon atoms, wherein y is 2 to about 6 carbon atoms, and wherein n is 0 or 1 to about 50 carbon atoms.

21. The aqueous composition according to claim 15, wherein the associative thickener is present in an amount from about 0.01 to about 50 parts active weight per 100 parts by weight of the aqueous composition.

22. The aqueous composition according to claim 21, wherein the associative thickener is present in an amount from about 0.05 to about 5 parts active weight per 100 parts by weight of the aqueous composition.

23. The aqueous composition according to claim 15, wherein said surfactant is selected from an anionic, cationic, amphoteric, and non-ionic surfactant.

24. The aqueous composition according to claim 15, wherein said composition further comprises a quaternary ammonium compound.

25. The aqueous composition according to claim 15, wherein said surfactant in component b) is selected from anionic, cationic, nonionic, amphoteric, zwitterionic, and mixtures thereof.

26. The aqueous composition according to claim 1 further comprising at least one additive selected from pigments, defoamer, solvent, neutralizer, dispersant, biocide, plasticizer, and stabilizer.

* * * * *